US012594628B2

(12) United States Patent
Miyakawa

(10) Patent No.: US 12,594,628 B2
(45) Date of Patent: Apr. 7, 2026

(54) BEAM PROCESSING APPARATUS

(71) Applicant: NIKON CORPORATION, Tokyo (JP)

(72) Inventor: Tomoki Miyakawa, Kumagaya (JP)

(73) Assignee: NIKON CORPORATION, Tokyo (JP)

( * ) Notice: Subject to any disclaimer, the term of this patent is extended or adjusted under 35 U.S.C. 154(b) by 955 days.

(21) Appl. No.: 17/787,818

(22) PCT Filed: Dec. 26, 2019

(86) PCT No.: PCT/JP2019/051135
§ 371 (c)(1),
(2) Date: Jun. 21, 2022

(87) PCT Pub. No.: WO2021/130962
PCT Pub. Date: Jul. 1, 2021

(65) Prior Publication Data
US 2023/0029429 A1 Jan. 26, 2023

(51) Int. Cl.
*B23K 26/36* (2014.01)
*B23K 26/03* (2006.01)
(Continued)

(52) U.S. Cl.
CPC .............. *B23K 26/36* (2013.01); *B23K 26/08* (2013.01); *B23K 26/032* (2013.01); *B23K 26/082* (2015.10); *B23K 26/364* (2015.10)

(58) Field of Classification Search
CPC ...... B23K 26/36; B23K 26/08; B23K 26/032; B23K 26/082; B23K 26/364
See application file for complete search history.

(56) References Cited

U.S. PATENT DOCUMENTS 8,872,065 B2 10/2014 Pluss
2004/0217095 A1* 11/2004 Herzog ................... B22F 10/66
219/121.85
(Continued)

FOREIGN PATENT DOCUMENTS

DE 10 2007 012 816 A1 9/2008
JP 2000-071086 A 3/2000
(Continued)

OTHER PUBLICATIONS

Mar. 24, 2023 Office Action issued in Chinese Patent Application No. 201980103236.9.
(Continued)

*Primary Examiner* — Elizabeth M Kerr
*Assistant Examiner* — Keith Brian Assante
(74) *Attorney, Agent, or Firm* — OLIFF PLC.

(57) ABSTRACT

A beam processing apparatus is a beam processing apparatus that irradiates a workpiece with a processing beam, and performs a removal processing of a first part of the workpiece by irradiating a first surface of the workpiece with the processing beam while moving an irradiation position of the processing beam along a first direction, and performs a removal processing of a second part of the workpiece by irradiating a second surface, which is formed at the workpiece by the removal processing of the first part, with the processing beam while moving the irradiation position of the processing beam along the first direction. A moving range of the processing beam for the removal processing of the second part is smaller than a moving range of the processing beam for the removal processing of the first part.

13 Claims, 14 Drawing Sheets

(51) Int. Cl.
| | |
|---|---|
| *B23K 26/08* | (2014.01) |
| *B23K 26/082* | (2014.01) |
| *B23K 26/364* | (2014.01) |

(56) References Cited

U.S. PATENT DOCUMENTS

| | | | |
|---|---|---|---|
| 2005/0045090 | A1 | 3/2005 | Ikegami et al. |
| 2010/0147815 | A1 | 6/2010 | Hildebrand et al. |
| 2021/0107095 | A1* | 4/2021 | Bernardi ............... B32B 15/012 |
| 2021/0276306 | A1* | 9/2021 | Jung ........................ B32B 27/08 |
| 2021/0308800 | A1* | 10/2021 | Funaoka .............. B23K 26/382 |
| 2021/0331273 | A1* | 10/2021 | Finn ................... B23K 26/0624 |
| 2022/0032741 | A1* | 2/2022 | Yeh .................... B23K 26/0624 |
| 2022/0184745 | A1* | 6/2022 | Inoue .................. B23K 26/032 |
| 2023/0029429 | A1 | 1/2023 | Miyakawa |

FOREIGN PATENT DOCUMENTS

| | | |
|---|---|---|
| JP | 2005-533172 A | 11/2005 |
| JP | 2012-071314 A | 4/2012 |
| WO | 2021/130962 A1 | 7/2021 |

OTHER PUBLICATIONS

Nov. 8, 2023 Office Action issued in Japanese Patent Application No. 2021-566684.

Apr. 15, 2025 Office Action issued in Japanese Patent Application No. 2024-017354.

Jun. 27, 2023 Office Action Issued in Japanese Patent Application No. 2021-566684.

Aug. 31, 2023 Extended European Search Report issued in European Patent Application No. 19958060.6.

Mar. 31, 2020 International Search Report issued in International Patent Application No. PCT/JP2019/051135.

Mar. 31, 2020 Written Opinion issued in International Patent Application No. PCT/JP2019/051135.

* cited by examiner

FIG. 2A                                    FIG. 2B

←     SCAN OPERATION

←-----     STEP OPERATION

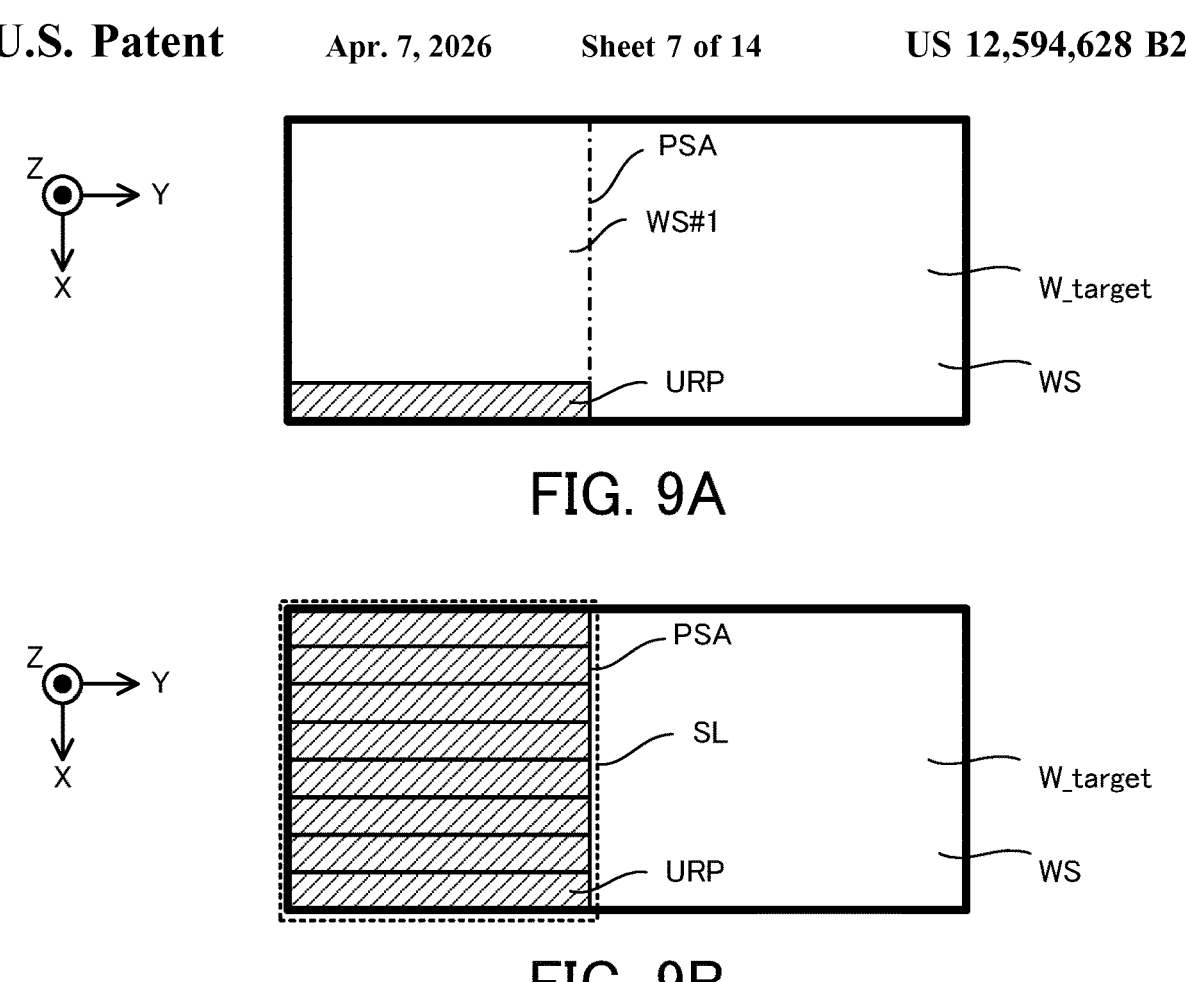
FIG. 9A
FIG. 9B
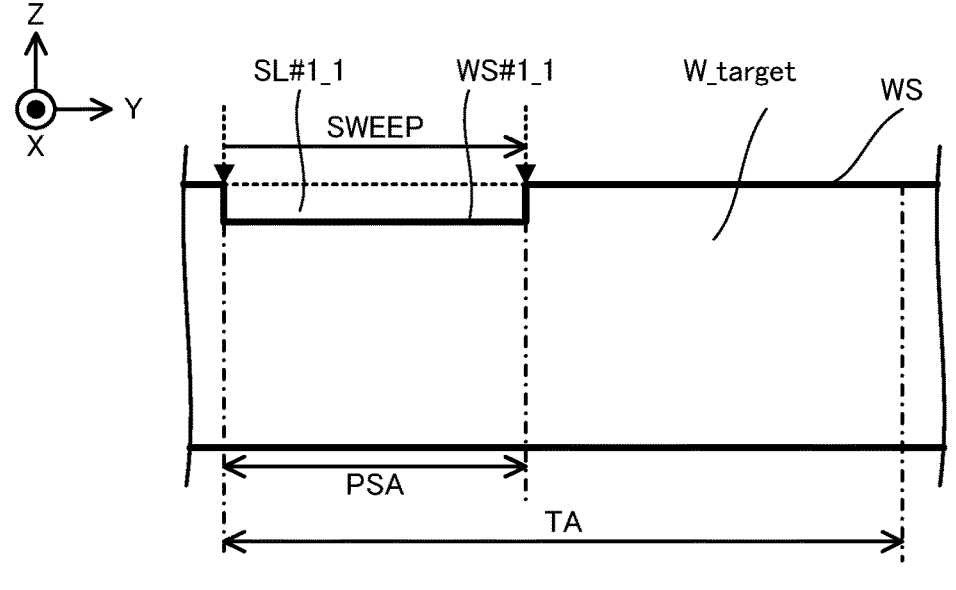
FIG. 10

MOVING RANGE OF
PROCESSING LIGHT EL WHEN
REMOVAL PROCESSING OF
SL#1_1 IS PERFORMED

MOVING RANGE OF
PROCESSING LIGHT EL WHEN
REMOVAL PROCESSING OF
SL#1_2 IS PERFORMED

MOVING RANGE OF
PROCESSING LIGHT EL WHEN
REMOVAL PROCESSING OF
SL#1_3 IS PERFORMED

MOVING RANGE OF
PROCESSING LIGHT EL WHEN
REMOVAL PROCESSING OF
SL#1_6 IS PERFORMED

MOVING RANGE OF
PROCESSING LIGHT EL WHEN
REMOVAL PROCESSING OF
SL#2_1 IS PERFORMED

MOVING RANGE OF
PROCESSING LIGHT EL WHEN
REMOVAL PROCESSING OF
SL#2_2 IS PERFORMED

MOVING RANGE OF
PROCESSING LIGHT EL WHEN
REMOVAL PROCESSING OF
SL#2_3 IS PERFORMED

MOVING RANGE OF
PROCESSING LIGHT EL WHEN
REMOVAL PROCESSING OF
SL#2_6 IS PERFORMED

MOVING RANGE OF
PROCESSING LIGHT EL WHEN
REMOVAL PROCESSING OF
SL#3_1 IS PERFORMED

MOVING RANGE OF
PROCESSING LIGHT EL WHEN
REMOVAL PROCESSING OF
SL#3_2 IS PERFORMED

MOVING RANGE OF
PROCESSING LIGHT EL WHEN
REMOVAL PROCESSING OF
SL#3_3 IS PERFORMED

MOVING RANGE OF
PROCESSING LIGHT EL WHEN
REMOVAL PROCESSING OF
SL#3_6 IS PERFORMED

BEAM PROCESSING APPARATUS

TECHNICAL FIELD

The present invention relates to a beam processing apparatus that is configured to process an object by using a processing beam.

BACKGROUND ART

A Patent Literature 1 discloses a processing apparatus that is configured to process a workpiece by irradiating the workpiece with a laser light that is one example of a processing beam. In a technical field such as the processing of the workpiece, it is desirable to improve a performance of the processing of the workpiece.

CITATION LIST

Patent Literature

Patent Literature 1: US2005/0045090A1

SUMMARY OF INVENTION

One aspect of the invention provides a beam processing apparatus that irradiates a workpiece with a processing beam, the beam processing apparatus includes: a beam irradiation apparatus that includes: an irradiation optical system that emits the processing beam; and a beam irradiation position change member that is disposed on an optical path of the processing beam and that changes an irradiation position of the processing beam on the workpiece; and a control apparatus that controls the beam irradiation apparatus, the control apparatus controls the beam irradiation apparatus to perform a removal processing of a first part of the workpiece by irradiating a first surface of the workpiece with the processing beam while moving the irradiation position of the processing beam along a first direction, and to perform a removal processing of a second part of the workpiece by irradiating a second surface of the workpiece, which is formed at the workpiece by the removal processing of the first part, with the processing beam while moving the irradiation position of the processing beam along the first direction, the control apparatus controls the beam irradiation apparatus so that a moving range of the processing beam for the removal processing of the second part is smaller than a moving range of the processing beam for the removal processing of the first part.

Figure 2C:
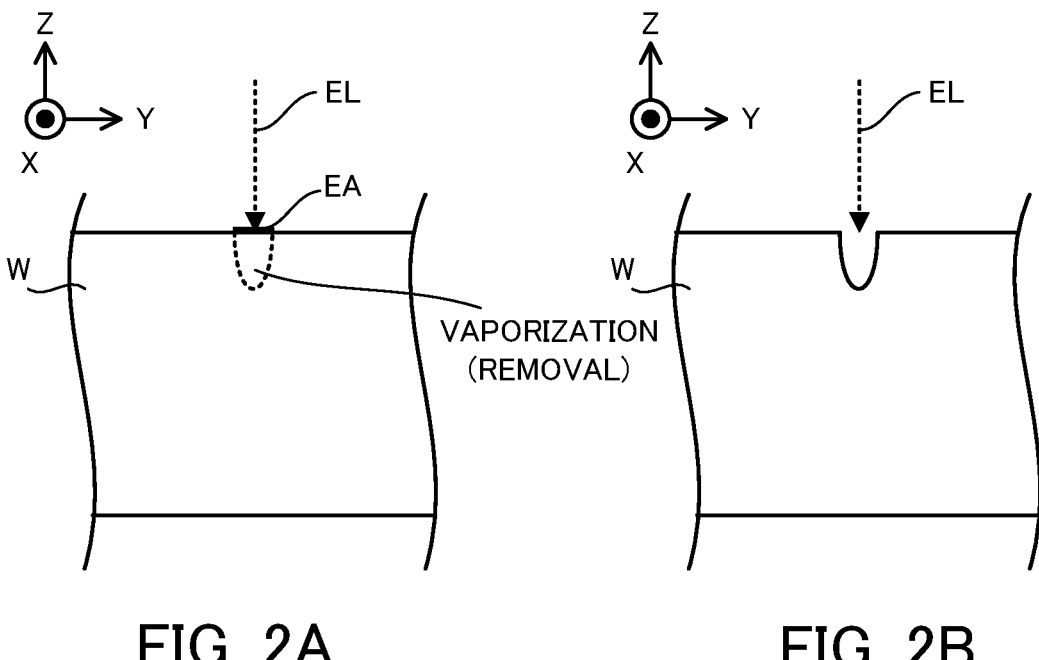
Figure 2C:
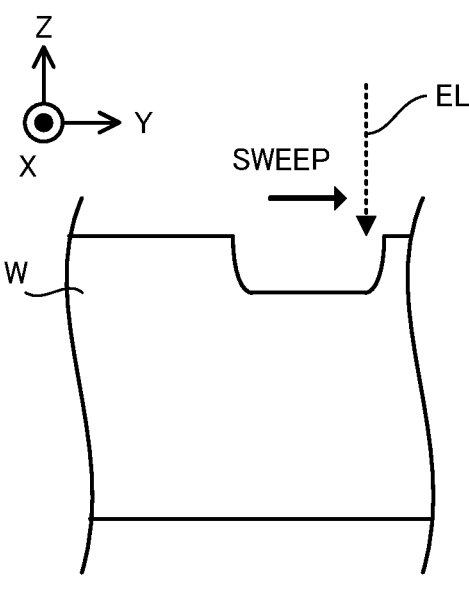

Each of FIG. 2A to FIG. 2C is a cross-sectional view that illustrates an aspect of a removal processing performed on a workpiece.

Figure 3:
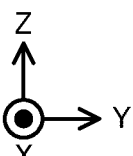
Figure 3:
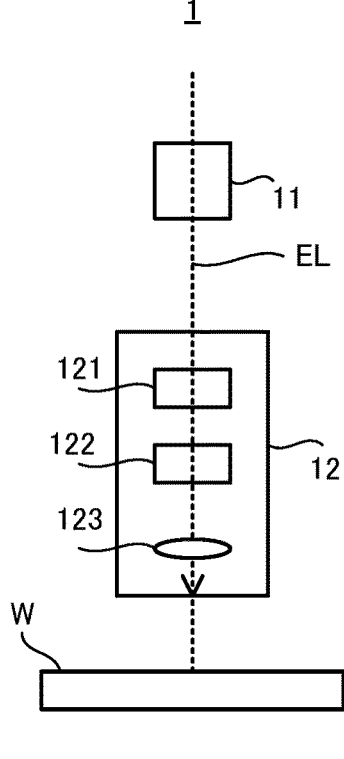

FIG. 3 is a cross-sectional view that illustrates a configuration of a processing apparatus.

Figure 4:
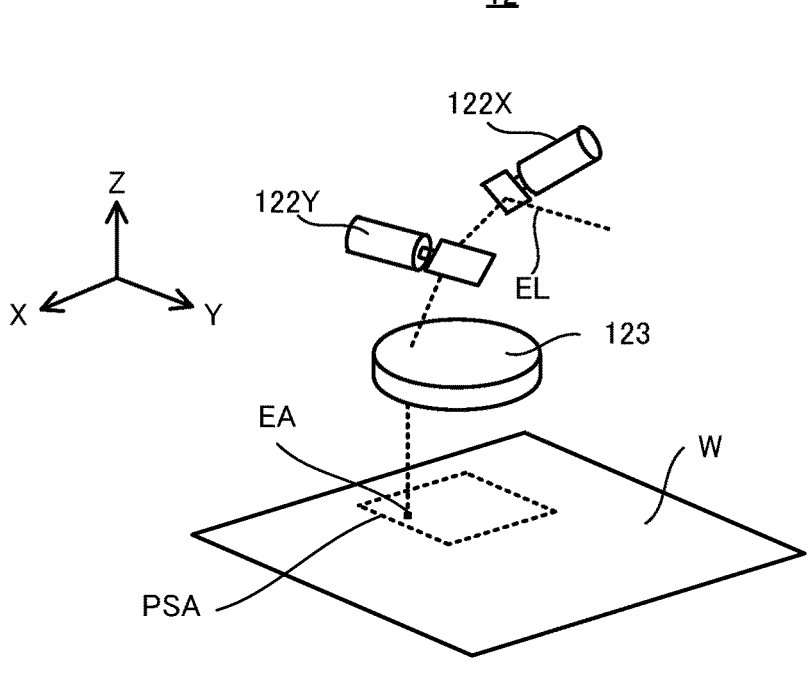

FIG. 4 is a perspective view that illustrates a configuration of an optical system of the processing apparatus.

Figure 5A:
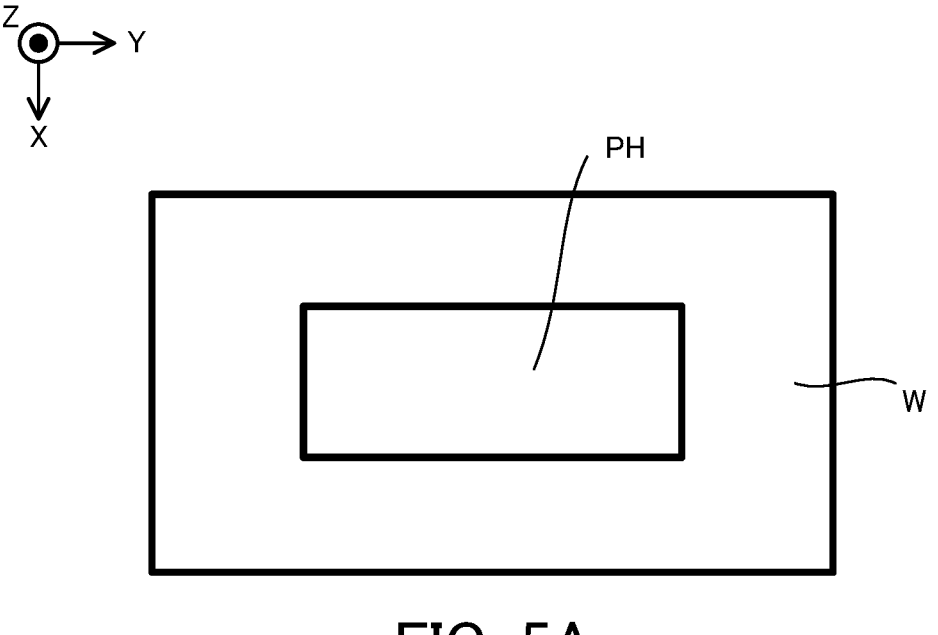
Figure 5B:
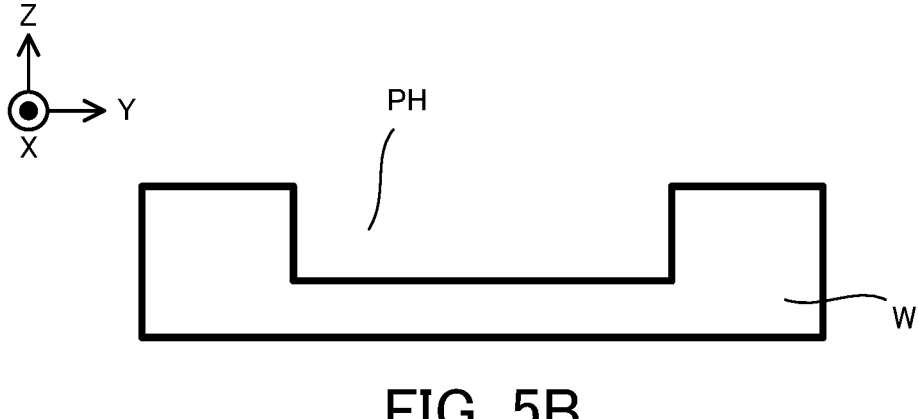

FIG. 5A is a planar view that illustrates one example of the processed workpiece and FIG. 5B is a cross-sectional view that illustrates one example of the processed workpiece.

Figure 6A:
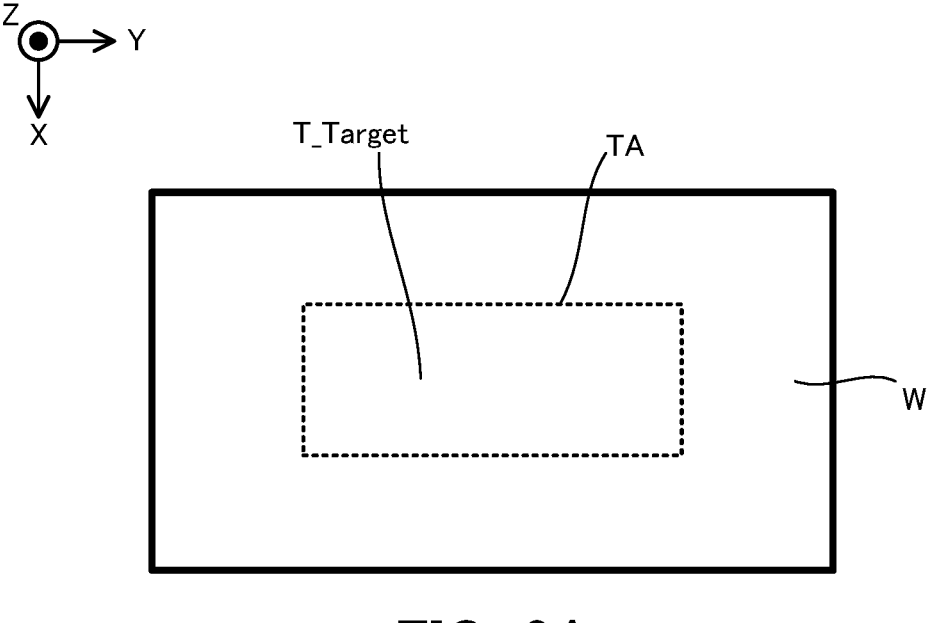
Figure 6B:
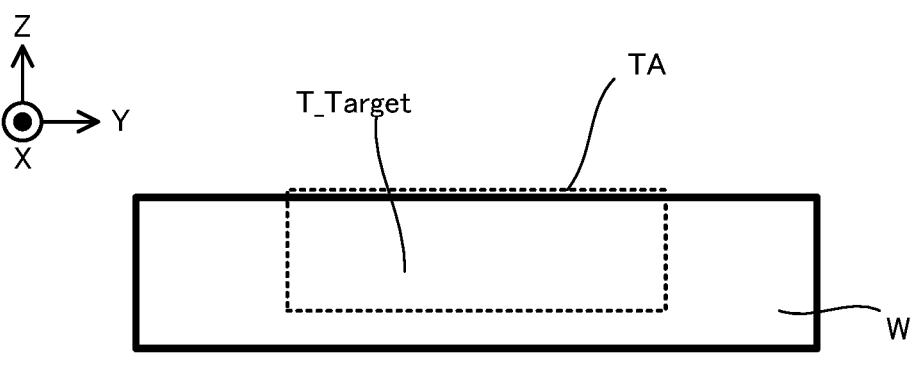
Figure 7A:
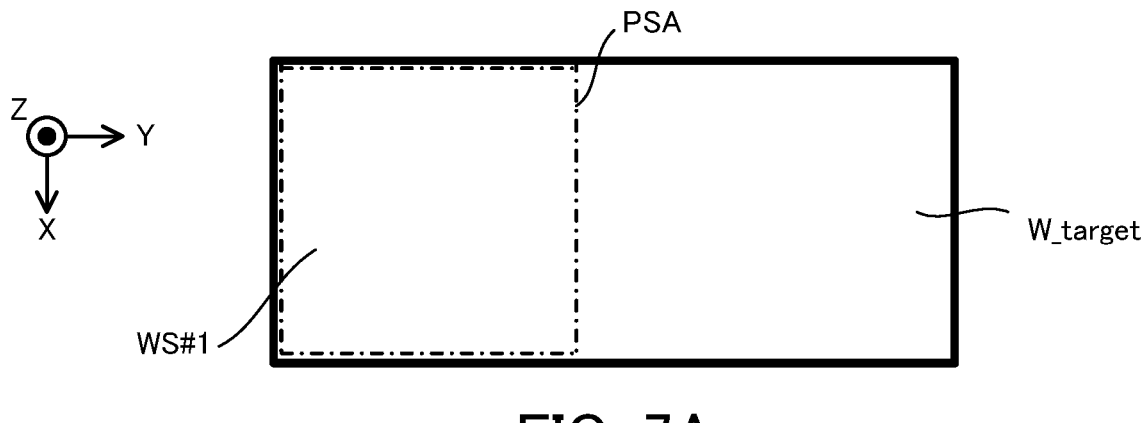
Figure 7B:
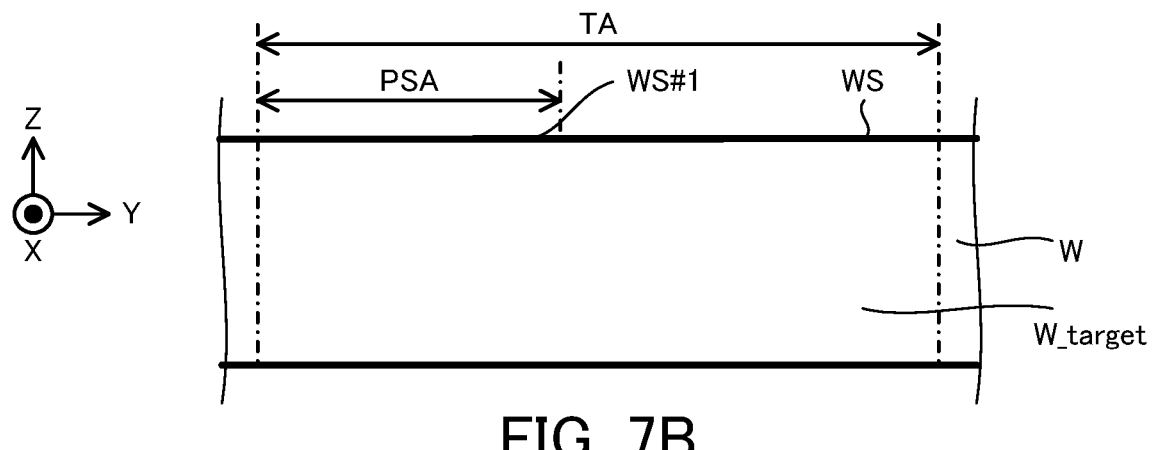

FIG. 6A is a planar view that illustrates one example of a positional relationship between a processing target area and the workpiece and FIG. 6B is a cross-sectional view that illustrates one example of the positional relationship between the processing target area and the workpiece FIG. 7A is a planar view that illustrates a processing shot area set on a first surface of a processing target part and FIG. 7B is a cross-sectional view that illustrates the processing shot area set on the first surface of the processing target part.

Figure 8:
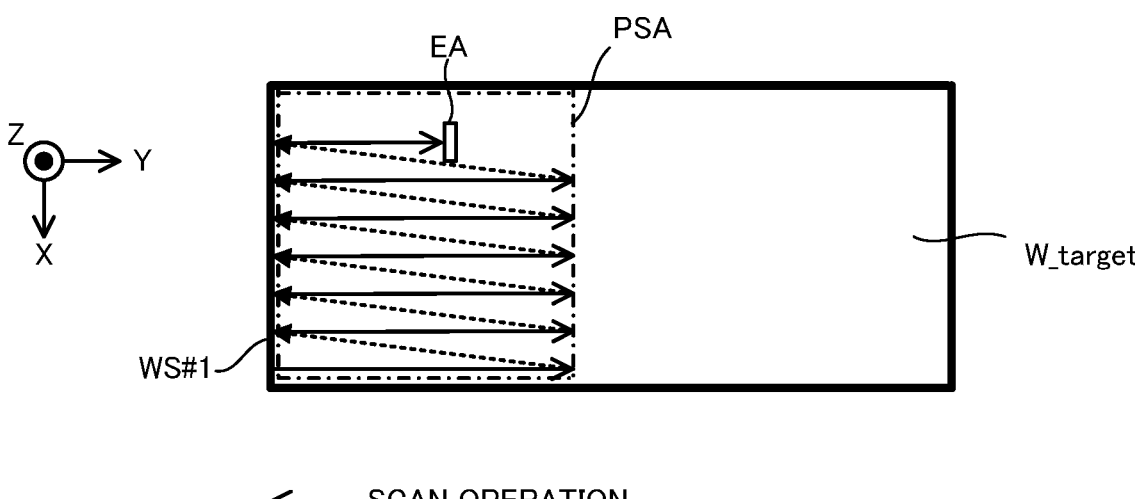

FIG. 8 is a planar view that illustrates a moving trajectory of an irradiation area on a surface of the processing target part.

FIG. 9A is a planar view that illustrates the processing target part on which a scan operation is performed one time and FIG. 9B is a planar view that illustrates the processing target part on which the scan operation is performed a plurality of times.

FIG. 10 is a cross-sectional view that illustrates the workpiece from which a single layered part is already removed.

Figure 11:
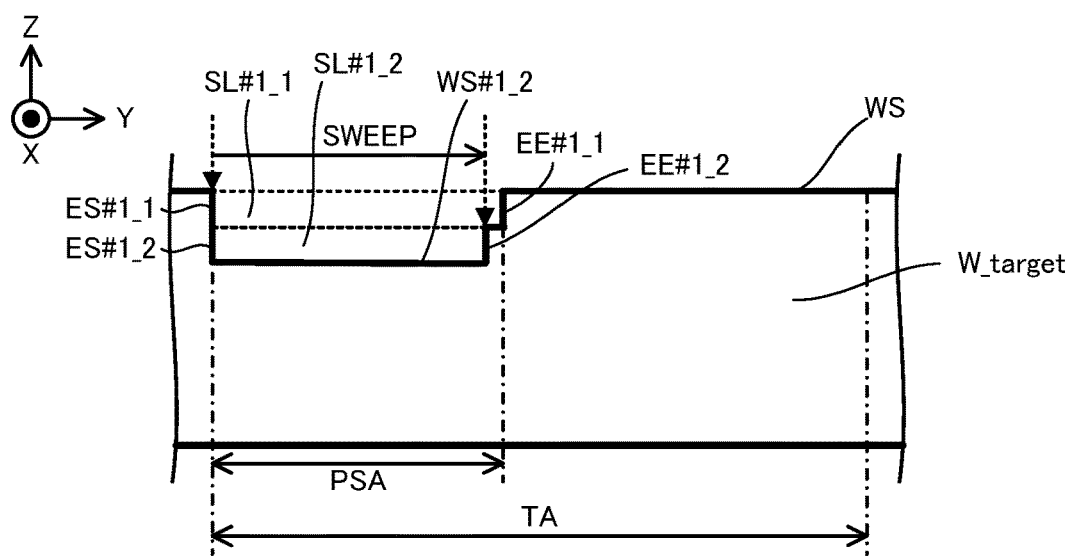

FIG. 11 is a cross-sectional view that illustrates the workpiece from which a plurality of layered parts are already removed.

Figure 12:
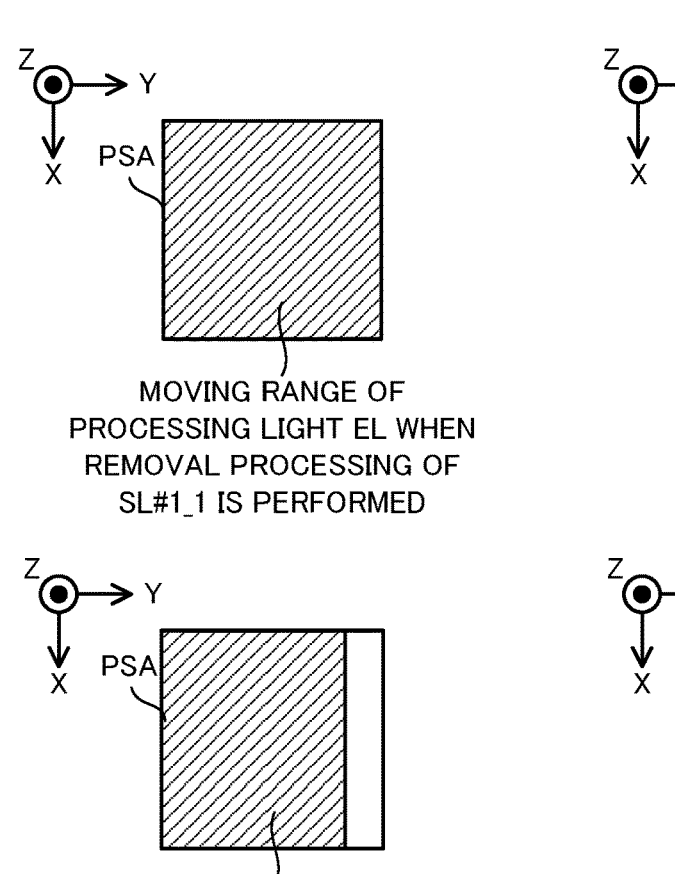
Figure 12:
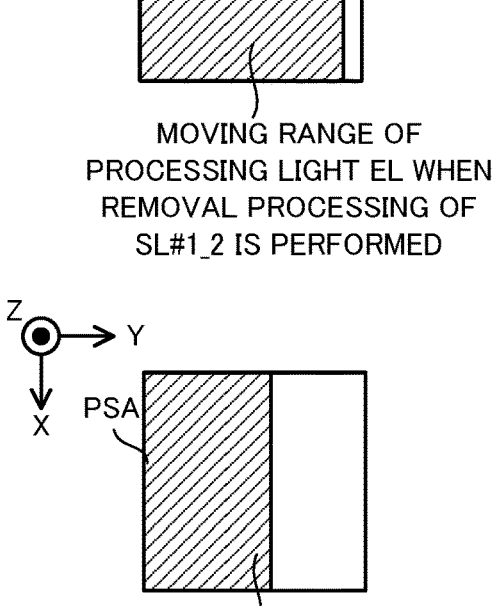

FIG. 12 is a planar view that illustrates a moving range of a processing light in a processing shot area when a first unit processing target part is removed.

Figures 13, 14:
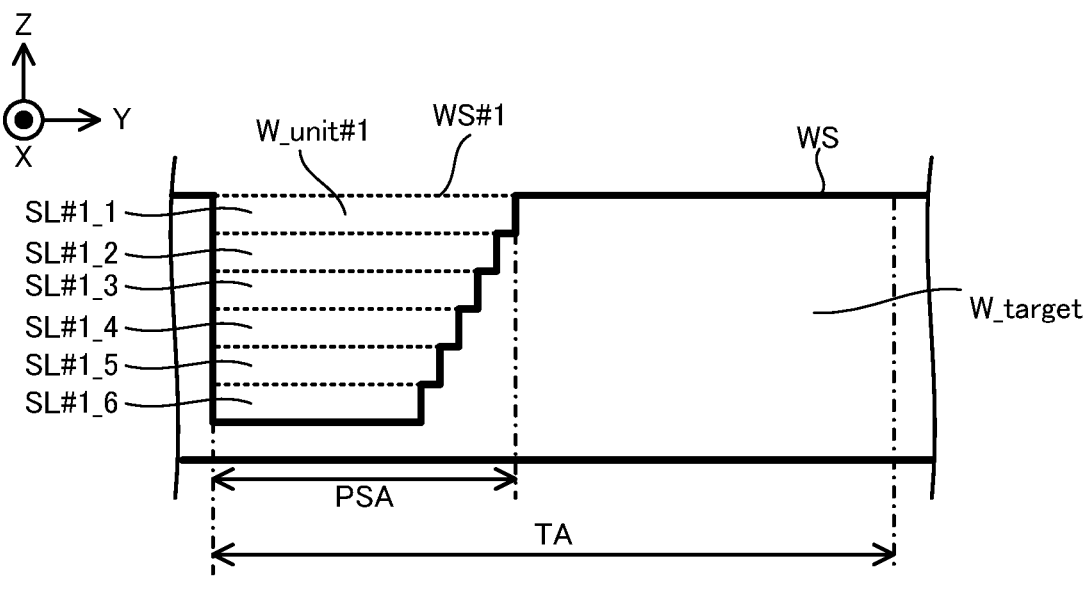

FIG. 13 is a cross-sectional view that illustrates the workpiece from which the first unit processing target part is already removed.

FIG. 14 is a cross-sectional view that illustrates the processing shot area that is set to remove a second unit processing target part.

Figures 15, 16:
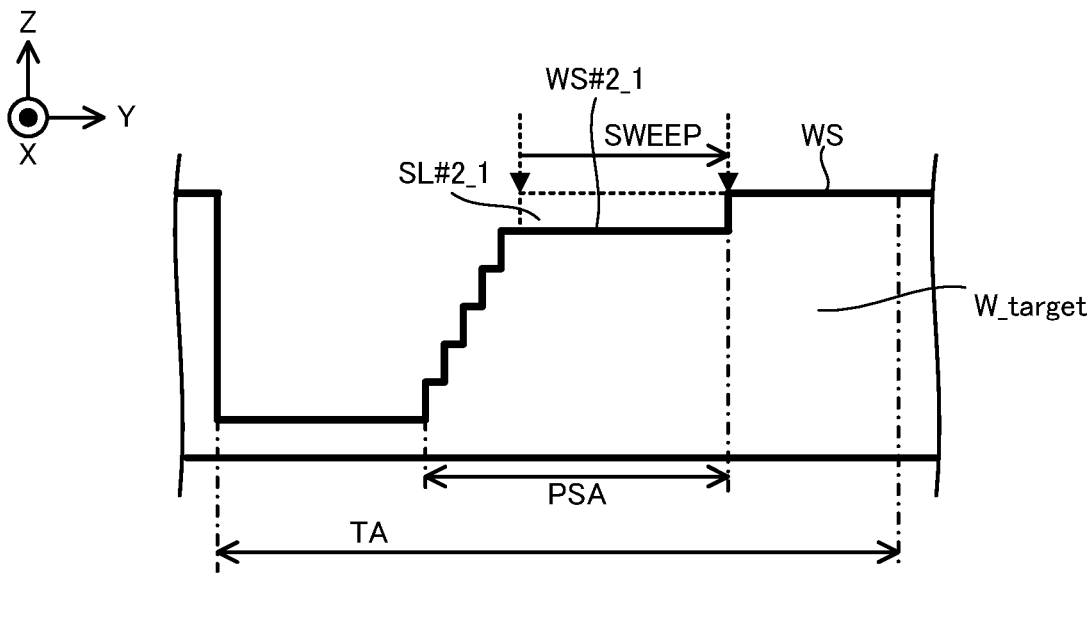

FIG. 15 is a cross-sectional view that illustrates the workpiece from which a single layered part constituting the second unit processing target part is already removed.

FIG. 16 is a cross-sectional view that illustrates the workpiece from which a plurality of layered parts constituting the second unit processing target part are already removed.

Figure 17:
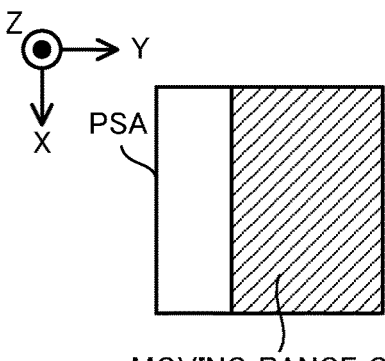
Figure 17:
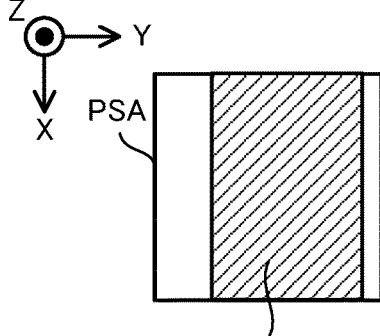
Figure 17:
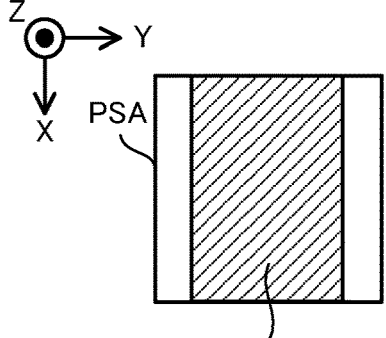
Figure 17:
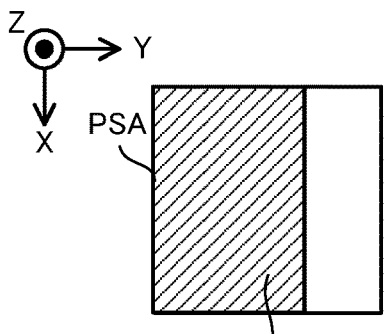

FIG. 17 is a planar view that illustrates a moving range of the processing light in the processing shot area when the second unit processing target part is removed.

Figure 18:
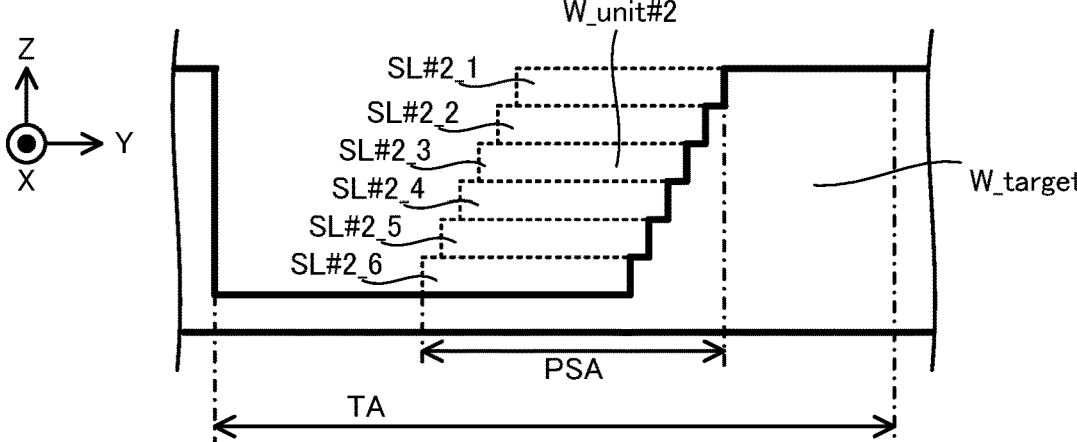

FIG. 18 is a cross-sectional view that illustrates the workpiece from which the second unit processing target part is already removed.

Figure 19:
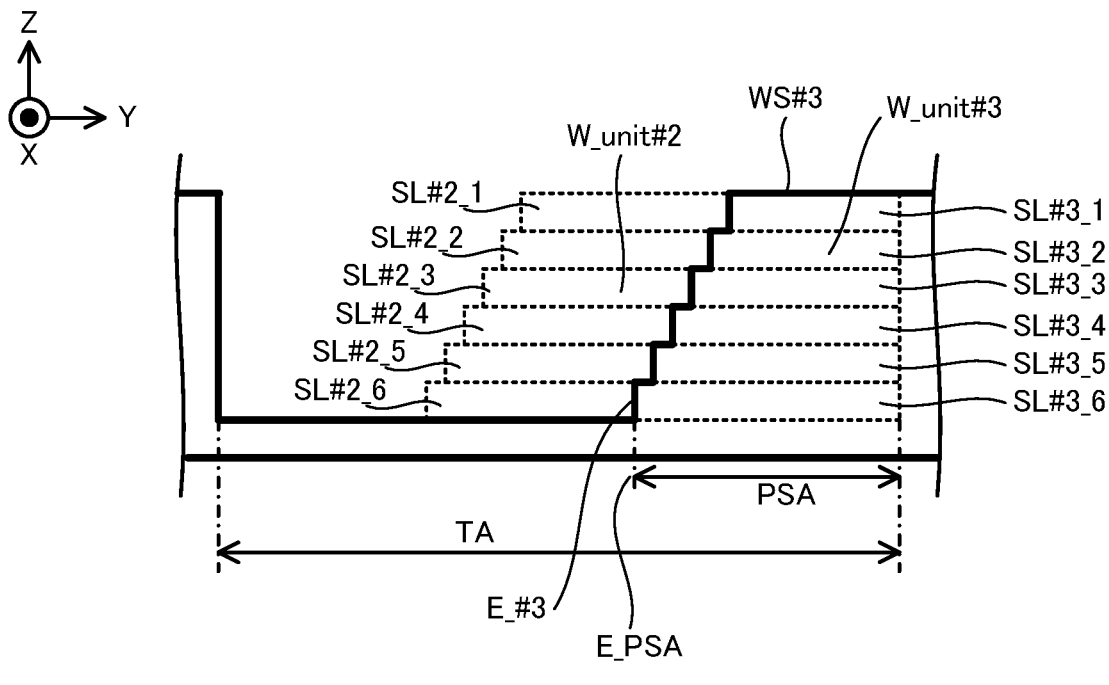

FIG. 19 is a cross-sectional view that illustrates the processing shot area that is set to remove a third unit processing target part.

Figure 20:
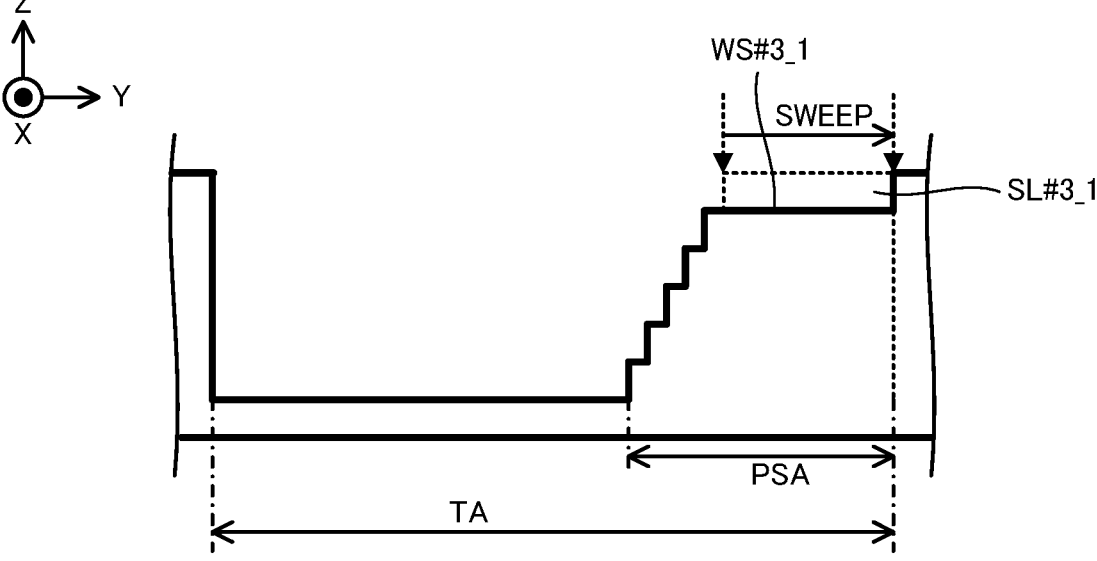

FIG. 20 is a cross-sectional view that illustrates the workpiece from which a single layered part constituting the second unit processing target part is already removed.

Figure 21:
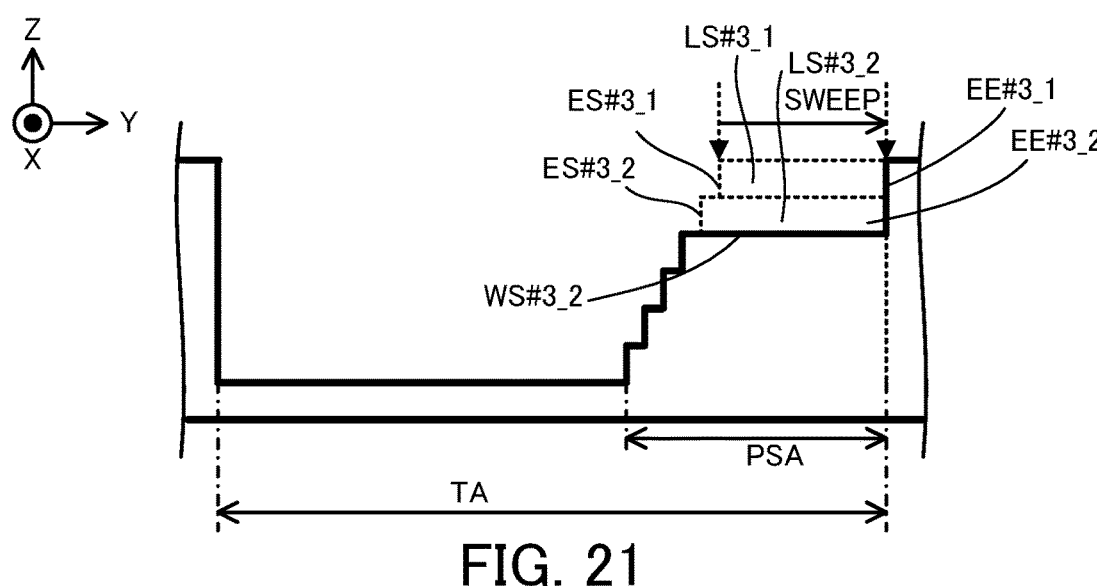

FIG. 21 is a cross-sectional view that illustrates the workpiece from which a plurality of layered parts constituting the third unit processing target part are already removed.

Figure 22:
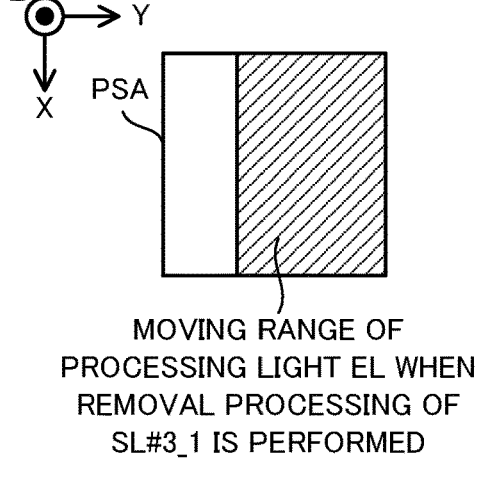
Figure 22:
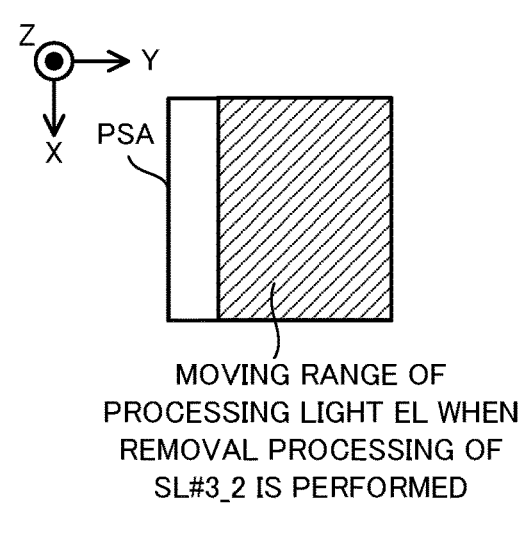
Figure 22:
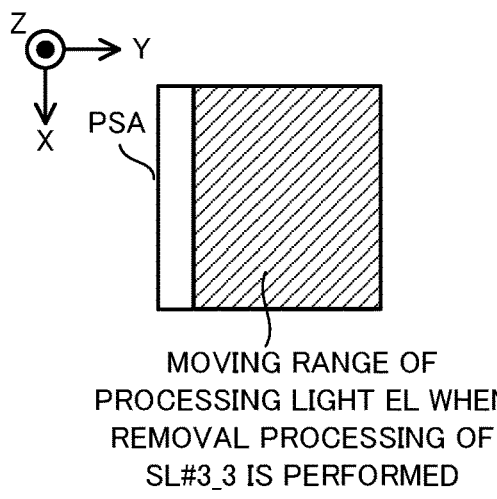
Figure 22:
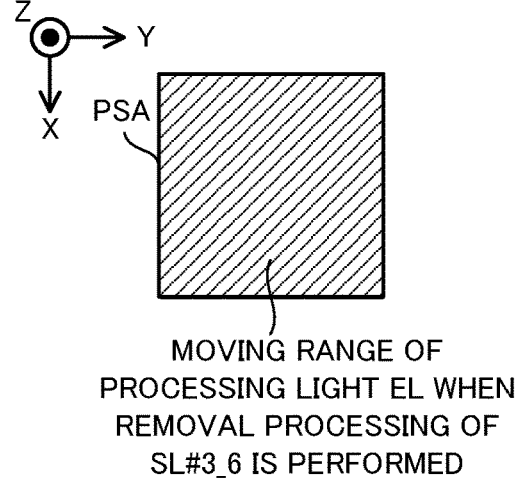

FIG. 22 is a planar view that illustrates a moving range of the processing light in the processing shot area when the third unit processing target part is removed.

Figure 23:
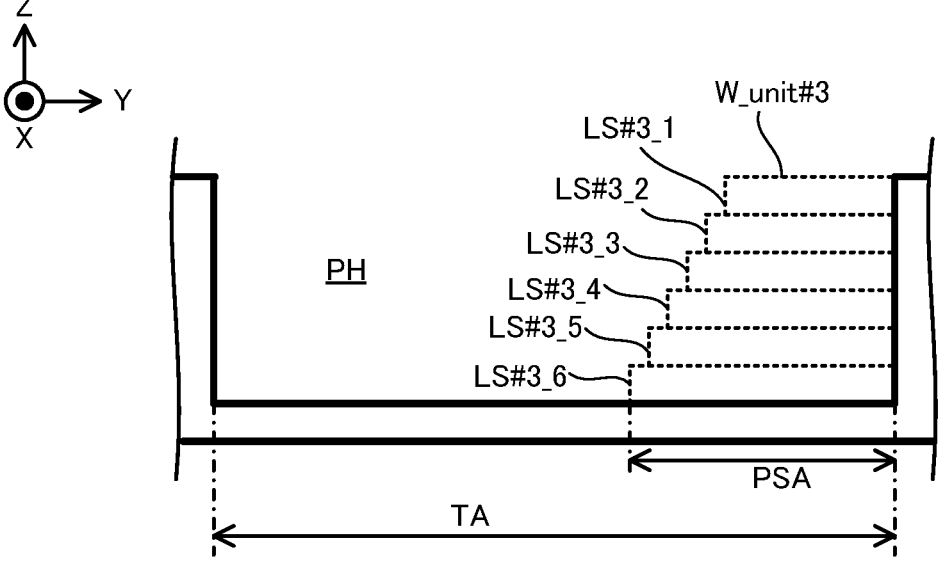

FIG. 23 is a cross-sectional view that illustrates the workpiece from which the third unit processing target part is already removed.

DESCRIPTION OF EMBODIMENTS

Next, with reference to drawings, an embodiment of a beam processing apparatus will be described. In the below described description, a processing system SYS to which the embodiment of the beam processing apparatus is applied will be described. Note that the processing system SYS may be referred to as a beam processing apparatus.

Moreover, in the below described description, a positional relationship of various components that constitute the processing system SYS will be described by using an XYZ rectangular coordinate system that is defined by a X axis, a Y axis and a Z axis that are perpendicular to one another. Note that each of an X axis direction and a Y axis direction is assumed to be a horizontal direction (namely, a predetermined direction in a horizontal plane) and a Z axis direction is assumed to be a vertical direction (namely, a direction that is perpendicular to the horizontal plane, and substantially an up-down direction or a gravity direction), for the purpose of simple description, in the below described description. Moreover, rotational directions (in other words, inclination directions) around the X axis, the Y axis and the Z axis are referred to as a θX direction, a θY direction and a θZ direction, respectively. Here, the Z axis direction may be the gravity direction. An XY plane may be a horizontal direction.

(1) Configuration of Processing System Sys

Figure 1:
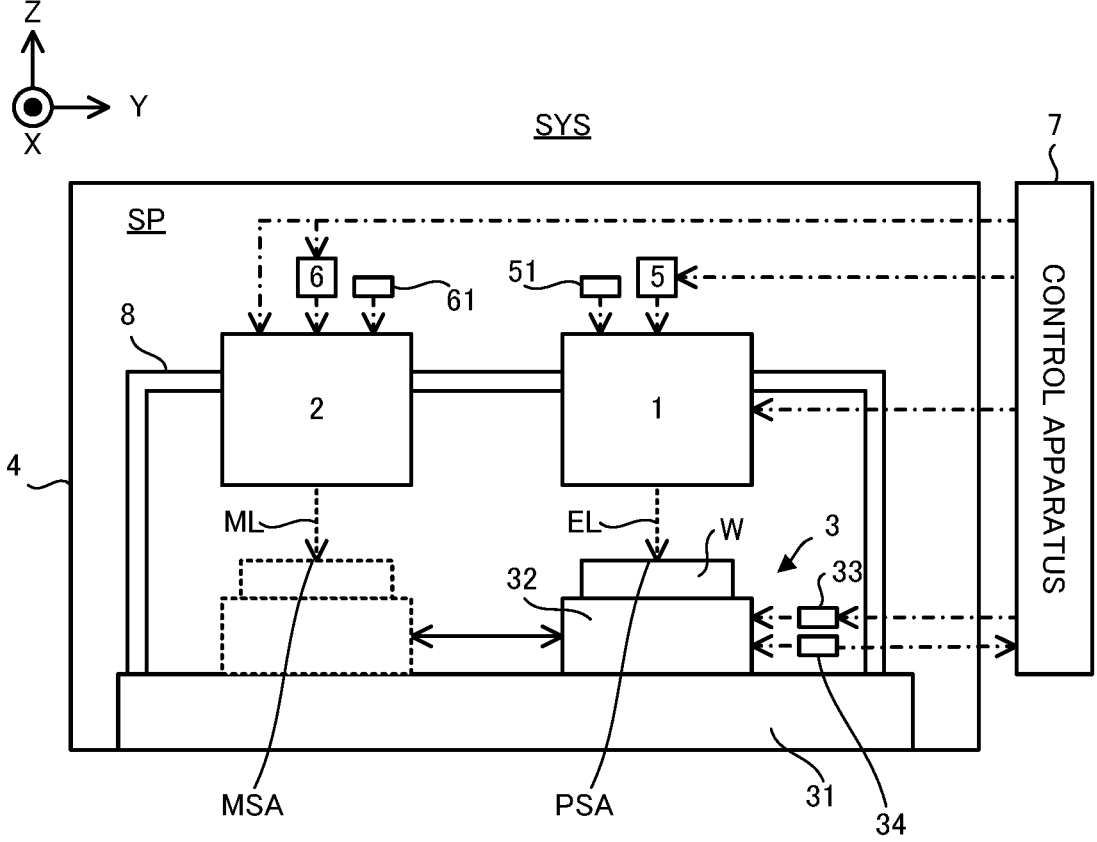
FIG. 1 is a cross-sectional view that illustrates a configuration of a processing system in the present embodiment.

Firstly, with reference to FIG. 1, a configuration of the processing system SYS will be described. FIG. 1 is a cross-sectional view that illustrates the configuration of the processing system SYS. Note that FIG. 1 does not illustrate a cross-sectional surface of a part of the components of the processing system SYS for the purpose of simple illustration.

As illustrated in FIG. 1, the processing system SYS includes a processing apparatus 1, a measurement apparatus 2, a stage apparatus 3, a housing 4, a driving system 5, a driving system 6 and a control apparatus 7.

The processing apparatus 1 is configured to processes a workpiece W under the control of the control apparatus 7. The workpiece W may be a metal, may be an alloy (for example, a duralumin and the like), may be a composite material such as a CFRP (Carbon Fiber Reinforced Plastic), or may be an object that is made from any other material, for example.

The processing apparatus 1 irradiates the workpiece W with a processing light EL in order to process the workpiece W. thus, the processing apparatus 1 may be referred to as a beam irradiation apparatus. The processing light EL may be any type of light, as long as the workpiece W is processed by irradiating the workpiece W with it. In the present embodiment, an example in which the processing light EL is a laser light will be described, however, the processing light EL may be a light a type of which is different from the laser light. Furthermore, a wavelength of the processing light EL may be any wavelength, as long as the workpiece W is processed by irradiating the workpiece W with it. For example, the processing light EL may be a visible light, may be an invisible light (for example, at least one of an infrared light, an ultraviolet light and the like).

In the present embodiment, the processing apparatus 1 performs a removal processing (typically, a cutting processing or a grinding processing) for removing a part of the workpiece W by irradiating the workpiece W with the processing light EL. Note that the processing apparatus 1 may perform a processing (for example, an additive processing or a marking processing) that is different from the removal processing, as described later. The removal processing may include at least one of a surface cutting processing, a surface grinding processing, a cylindrical cutting processing, a cylindrical grinding processing, a drilling cutting processing, a drilling grinding processing, a surface polishing processing, a cutting-off processing and a carving processing (in other words, a stamping processing) for forming (in other words, carving) any character or any pattern.

Here, with reference to each of FIG. 2A to FIG. 2C, one example of the removal processing using the processing light EL will be described. Each of FIG. 2A to FIG. 2C is a cross-sectional view that illustrates an aspect of the removal processing performed on the workpiece W. As illustrated in FIG. 2A, the processing apparatus 1 irradiates a target irradiation area EA, which is set on a surface of the workpiece W as an area that is irradiated with the processing light from the processing apparatus 1, with the processing light EL. When the target irradiation area EA is irradiated with the processing light EL, an energy of the processing light EL is transmitted to an energy transmitted part including at least one of a part of the workpiece W that overlaps with the target irradiation area EA and a part of the workpiece W that is in vicinity of the target irradiation area EA. When a heat caused by the energy of the processing light EL is transmitted, a material constituting the energy transmitted part of the workpiece W is melted due to the heat caused by the energy of the processing light EL. The melted material spatters as liquid drop. Alternatively, the melted material evaporates due to the heat caused by the energy of the processing light EL. As a result, the energy transmitted part of the workpiece W is removed. Namely, as illustrated in FIG. 2B, a concave part (in other words, a groove part) is formed at the surface of the workpiece W. In this case, it can be said that the processing apparatus 1 processes the workpiece W by using a principle of what we call a thermal processing. Furthermore, as described later, a Galvano mirror 122 of the processing apparatus 1 moves the target irradiation area EA on the surface of the workpiece W so that the surface of the workpiece W is swept with the processing light EL. As a result, as illustrated in FIG. 2C, the surface of the workpiece W is partially removed along a sweeping trajectory of the processing light EL (namely, a moving trajectory of the target irradiation area EA). Namely, the surface of the workpiece W is partially cut out along the sweeping trajectory of the processing light EL (namely, the moving trajectory of the target irradiation area EA). Thus, the processing apparatus 1 appropriately removes a part of the workpiece W on which the removal processing should be performed by sweeping the surface of the workpiece W with the processing light EL along a desired sweeping trajectory corresponding to an area on which the removal processing should be performed.

On the other hand, the processing apparatus 1 may process the workpiece W by using a principle of non-thermal processing (for example, an ablation processing) depending on a characteristic of the processing light EL. Namely, the processing apparatus 1 may perform the non-thermal processing (for example, the ablation processing) on the workpiece W. For example, when a pulsed light an emitting time of which is equal to or shorter than pico-second (alternatively, equal to or shorter than nano-second or femto-second in some cases) is used as the processing light EL, the material constituting the energy transmitted part of the workpiece W evaporates and spatters in a moment. Note that the material constituting the energy transmitted part of the workpiece W is sublimated without being in a melted state when the pulsed light an emitting time of which is equal to or shorter than pico-second (alternatively, equal to or shorter than nano-second or femto-second in some cases) is used as the processing light EL. Thus, the concave part (in other words, the groove part) is formed at the surface of the workpiece W while reducing an influence of the heat caused by the energy of the processing light EL to the workpiece W as much as possible.

In order to perform the removal processing, as illustrated in FIG. 3 that is a cross-sectional view that illustrates a structure of the processing apparatus 1, the processing apparatus 1 includes a light source 11 and an optical system 12.

The light source 11 is configured to generate the processing light EL. When the processing light EL is a laser light, the light source 11 may be a laser diode, for example. Moreover, the light source 11 may be a light source that is configured to pulse-oscillate. In this case, the light source 11 is configured to generate the pulsed light (for example, the pulsed light the emitting time of which is equal to or shorter than pico-second) as the processing light EL. The light source 11 emits the generated processing light EL toward the optical system 12. Note that the light source 11 may emit the processing light EL in a liner polarized state.

The optical system 12 is an optical system which the processing light EL emitted from the light source 11 enters. The optical system 12 is an optical system that emits (namely, guides) the processing light EL from the light source 11 toward the workpiece W. In order to emit the processing light EL toward the workpiece W, the optical system 12 includes a focus lens 121, the Galvano mirror 122 and fθ lens 123.

The focus lens 121 controls a convergence degree or a divergence degree of the processing light EL emitted from the optical system 12. By this, a light concentration position (for example, what we call a best light concentration position) of the processing light EL is controlled. Note that the optical system 12 may include an optical element that is configured to control any state of the processing light EL in addition to or instead of the focus lens 121. Any state of the processing light EL may include a pulse length of the processing light EL, a pulse number of the processing light EL, an intensity of the processing light EL, a propagating direction of the processing light and polarization state of the processing light EL in addition to or instead of at least one of the light concentration position of the processing light EL, a beam diameter of the processing light EL, the convergence degree or the divergence degree of the processing light EL and an intensity distribution of the processing light EL.

The Galvano mirror 122 is disposed on an optical path of the processing light EL from the focus lens 121. The Galvano mirror 122 deflects the processing light EL so that the workpiece W is swept with the processing light EL emitted from the fθ lens 123 (namely, the target irradiation area EA that is irradiated with the processing light EL moves on the surface of the workpiece W). Namely, the Galvano mirror 122 serves as an optical element that is configured to change an irradiation position of the processing light EL (namely, the position of the target irradiation area EA) on the workpiece W. Thus, the Galvano mirror 122 may be referred to as a beam irradiation position change member. As illustrated in FIG. 4 that is a perspective view that illustrates a configuration of a part of the optical system 12, the Galvano mirror 122 includes a X sweeping mirror 122X and a Y sweeping mirror 122Y. The X sweeping mirror 122X reflects the processing light EL to the Y sweeping mirror 122Y. The X sweeping mirror 122X is configured to swing or rotate in the θY direction (namely, in a rotational direction around the Y axis). Due to the swing or the rotation of the X sweeping mirror 122X, the surface of the workpiece W is swept with the processing light EL along the X axis direction. Due to the swing or the rotation of the X sweeping mirror 122X, the target irradiation area EA moves on the surface of the workpiece W along the X axis direction. Due to the swing or the rotation of the X sweeping mirror 122X, the position of the target irradiation area EA along the X axis direction is changed. The Y sweeping mirror 122Y reflects the processing light EL to the fθ lens 123. The Y sweeping mirror 122Y is configured to swing or rotate in the θX direction (namely, in a rotational direction around the X axis). Due to the swing or the rotation of the Y sweeping mirror 122Y, the surface of the workpiece W is swept with the processing light EL along the Y axis direction. Due to the swing or the rotation of the Y sweeping mirror 122X, the target irradiation area EA moves on the surface of the workpiece W along the Y axis direction. Due to the swing or the rotation of the Y sweeping mirror 122Y, the position of the target irradiation area EA along the Y axis direction is changed.

The fθ lens 123 is an optical element for irradiating the workpiece W with the processing light EL from the Galvano mirror 122. Thus, the fθ lens 123 may be referred to as an irradiation optical system. Especially, the fθ lens 123 is an optical element for concentrating the processing light EL from the Galvano mirror 122 on the workpiece W.

Again in FIG. 1, the measurement apparatus 2 is configured to measure the workpiece W under the control of the control apparatus 7. For example, the measurement apparatus 2 may be an apparatus that is configured to measure the state of the workpiece W. The state of the workpiece W may include a position of the workpiece W. The position of the workpiece W may include a position of the surface of the workpiece W. The position of the surface of the workpiece W may include a position of each surface part, which is obtained by segmentalizing the surface of the workpiece W, in at least one of the X axis direction, the Y axis direction and the Z axis direction. The state of the workpiece W may include the shape (for example, a three-dimensional shape) of the workpiece W. The shape of the workpiece W may include the shape of the surface of the workpiece W. The shape of the surface of the workpiece W may include a direction of each surface part, which is obtained by segmentalizing the surface of the workpiece W (for example, a direction of a normal line of each surface part, and it is substantially equivalent to an inclined amount of each surface part with respect to at least one of the X axis, the Y axis and the Z axis), in addition to or instead of the above described position of the surface of the workpiece W. A measurement information related to a measured result by the measurement apparatus 2 is outputted from the measurement apparatus 2 to the control apparatus 7.

The measurement apparatus 2 may measure the workpiece W by using a predetermined measurement method. At least one of a light section method, a white light interference method, a pattern projection method, a time of flight method, a moiré topography method (specifically, a grid irradiation method or a grid projection method), a holography interference method, an auto collimation method, a stereo method, an astigmatism method, a critical angle method, a knife edge method, an interference measurement method and a confocal method is one example of the measurement method. In any case, the measurement apparatus 2 may include a light source that emits a measurement light (for example, a slit light or a white light) ML and a light receiver that optically receives a light (for example, at least one of a reflected light and a scattered light of the measurement light ML) from the workpiece W that is irradiated with the measurement light ML.

The stage apparatus 3 is disposed below (namely, at the −Z side of) the processing apparatus 1 and the measurement apparatus 2. The stage apparatus 3 includes a surface plate 31 and a stage 32. The surface plate 31 is disposed on a bottom surface of the housing 4 (or on a support surface such as a floor surface on which the housing 4 is disposed). The stage 32 is disposed on the surface plate 31. Furthermore, a support frame 8 that supports the processing apparatus 1 and the measurement apparatus 2 may be disposed on the surface plate 31. Namely, the processing apparatus 1 and the measurement apparatus 2 (moreover, the stage 32) may be supported by the same surface plate 31.

The workpiece W is placed on the stage 32. In this case, the stage 32 may not hold the placed workpiece W. Alternatively, the stage 32 may hold the placed workpiece W. For example, the stage 32 may hold the workpiece W by vacuum-sucking and/or electrostatically sucking the workpiece W.

The stage 32 is movable on the surface plate 31 while the workpiece W being placed thereon under the control of the control apparatus 7. The stage 32 is movable relative to at least one of the surface plate 31, the processing apparatus 1 and the measurement apparatus 2. The stage 32 is movable along each of the X axis direction and the Y axis direction. In this case, the stage 32 is movable along a stage movement plane that is parallel to the XY plane. The stage 32 may be further movable along at least one of the Z axis direction, θX direction, the θY direction and the θZ direction. In order to move the stage 32, the stage apparatus 3 includes a stage driving system 33. The stage driving system 33 moves the stage 32 by using any motor (for example, a linear motor and the like). Furthermore, the stage apparatus 3 includes a position measurement device 34 for measure a position of the stage 32. The position measurement device 34 may include at least one of an encoder and a laser interferometer, for example.

When the stage 32 moves, a positional relationship between the stage 32 (moreover, the workpiece W placed on the stage 32) and each of the processing apparatus 1 (especially, the fθ lens 123) and the measurement apparatus 2 changes. Namely, when the stage 32 moves, a position of the stage 32 and the workpiece W relative to the processing apparatus 1 and the measurement apparatus 2 changes. Therefore, moving the stage 32 is equivalent to changing the positional relationship between each of the stage 32 and the workpiece W and each of the processing apparatus 1 (especially, the fθ lens 123) and the measurement apparatus 2. Thus, the stage apparatus 3 (especially, the stage driving system 33 that moves the stage 32) may be referred to as a position change apparatus The stage 32 may move so that at least a part of the workpiece W is located in a processing shot area PSA in at least a part of a processing period when the processing apparatus 1 processes the workpiece W. Note that the "processing shot area PSA" in the present embodiment is an area in which the processing by the processing apparatus 1 is performed in a state where a positional relationship between the processing apparatus 1 and the workpiece W is fixed (namely, is not changed). Typically, as illustrated in FIG. 4, the processing shot area PSA is set to be an area that is same as or narrower than a swept range of the processing light EL that is deflected by the Galvano mirror 122 in a state where the positional relationship between the processing apparatus 1 and the workpiece W is fixed. The processing shot area PSA is set to be an area that is same as or narrower than a range in which the target irradiation area EA is allowed to be set in the state where the positional relationship between the processing apparatus 1 and the workpiece W is fixed. Thus, the processing shot area PSA is an area that is defined based on the processing apparatus 1. When at least a part of the workpiece W is located in the processing shot area PSA (namely, the processing shot area PSA is located on the workpiece W), the processing apparatus 1 is allowed to irradiate at least a part of the workpiece W located in the processing shot area PSA with the processing light EL. As a result, at least a part of the workpiece W is processed by the processing light EL emitted from the processing apparatus 1 in a state where the workpiece W is placed on the stage 32. Incidentally, when the workpiece W is so large that whole of the workpiece W is not allowed to be located in the processing shot area PSA, a one part of the workpiece W is processed in a state where the one part is included in the processing shot area PSA, then, the stage 32 moves so that another part, which is different from the one part, of the workpiece W is included in the processing shot area PSA (moreover, the processing apparatus 1 moves by a below described driving system 5, if needed), and then, the another part of the workpiece W is processed. Then, same operation is repeated until the processing of the workpiece W is completed.

The stage 32 may move so that at least a part of the workpiece W is located in a measurement shot area MSA in at least a part of a measurement period when the measurement apparatus 2 measures the workpiece W. The measurement shot area MSA may be set to be a range that corresponds to a light receiving surface of the light receiver that optically receives the light from the workpiece W that is irradiated with the measurement light ML from the measurement apparatus 2 in a state where a positional relationship between the measurement apparatus 2 and the workpiece W is fixed. Thus, the measurement shot area MSA is an area that is defined based on the measurement apparatus 2.

The stage 32 may move between the processing shot area PSA and the measurement shot area MSA in a state where the workpiece W is placed on the stage 32. The stage 32 may move so that the workpiece W moves between the processing shot area PSA and the measurement shot area MSA in a state where the workpiece W is placed on the stage 32. Namely, the workpiece W may remain to be placed on the stage 32 in not only the processing period when the processing apparatus 1 processes the workpiece W and the measurement period when the measurement apparatus 2 measures the workpiece W but also a movement period when the workpiece W moves between the processing shot area PSA and the measurement shot area MSA.

The housing 4 houses the processing apparatus 1, the measurement apparatus 2 and the stage apparatus 3 in an inner housing space SP that is separated from a space outside the housing 4. Namely, in the present embodiment, the processing apparatus 1, the measurement apparatus 2 and the stage apparatus 3 are placed in the same housing 4. The processing apparatus 1, the measurement apparatus 2 and the stage apparatus 3 area located in the same housing space SP. When the workpiece W is placed on the stage 32 of the stage apparatus 3, the housing 4 houses the workpiece W in the inner housing space SP. Namely, the processing apparatus 1, the measurement apparatus 2 and the workpiece W area located in the same housing space SP. However, at least a part of the processing apparatus 1, the measurement apparatus 2 and the stage apparatus 3 may not be located in the housing space SP.

The driving system 5 moves the processing apparatus 1 under the control of the control apparatus 7. The driving system 5 moves the processing apparatus 1 relative to at least one of the surface plate 31, the stage 32 and the workpiece W placed on the stage 32. The driving system 5 may move the processing apparatus 1 relative to the measurement apparatus 2. The driving system 5 moves the processing apparatus 1 along at least one of the X axis direction, the Y axis direction, the Z axis direction, the $\theta$X direction, the $\theta$Y direction and the $\theta$Z direction. The driving system 5 includes a motor or the like, for example. Furthermore, the processing system SYS includes a position measurement device 51 that is configured to measure a position of the processing apparatus 1 that is moved by the driving system 5. The position measurement device 51 may include at least one of an encoder and an interferometer, for example.

When the driving system 5 moves the processing apparatus 1, the target irradiation area EA and the processing shot area PSA move on the workpiece W. Therefore, the driving system 5 is configured to change a positional relationship between the workpiece W and each of the target irradiation area EA and the processing shot area PSA by moving the processing apparatus 1. Furthermore, when the driving system 5 moves the processing apparatus 1, the positional relationship between the processing apparatus 1 (especially, the f$\theta$ lens 123) and each of the stage 32 and the workpiece W is changed. Thus, the driving system 5 may be referred to as the position change apparatus, as with the stage driving system 33.

The driving system 6 moves the measurement apparatus 2 under the control of the control apparatus 7. The driving system 6 moves the measurement apparatus 2 relative to at least one of the surface plate 31, the stage 32 and the workpiece W placed on the stage 32. The driving system 6 may move the measurement apparatus 2 relative to the processing apparatus 1. The driving system 6 moves the measurement apparatus 2 along at least one of the X axis direction, the Y axis direction, the Z axis direction, the $\theta$X direction, the $\theta$Y direction and the $\theta$Z direction. The driving system 6 includes a motor or the like, for example. Furthermore, the processing system SYS includes a position measurement device 61 that is configured to measure a position of the measurement apparatus 2 that is moved by the driving system 6. The position measurement device 61 may include at least one of an encoder and an interferometer, for example.

When the driving system 6 moves the measurement apparatus 2, the measurement shot area MSA moves on the workpiece W. Therefore, the driving system 6 is configured to change a positional relationship between the workpiece W and the measurement shot area MSA by moving the measurement apparatus 2.

The control apparatus 7 controls an operation of the processing system SYS. Specifically, the control apparatus 7 controls the operation of the processing system SYS 8 for example, the operation of at least one of the processing apparatus 1, the measurement apparatus 2, the stage apparatus 3, the driving system 5 and the driving system 6) so that the processing apparatus 1 properly processes the workpiece W.

The control apparatus 7 may include an arithmetic apparatus and a storage apparatus, for example. the arithmetic apparatus may include at least one of a CPU (Central Processing Unit) and a GPU (Graphical Processing Unit), for example. The control apparatus 7 serves as an apparatus for controlling the operation of the processing system SYS by the arithmetic apparatus executing a computer program. The computer program is a computer program that allows the control apparatus 7 (for example, the arithmetic apparatus) to execute (namely, to perform) a below described operation that should be executed by the control apparatus 7. Namely, the computer program is a computer program that allows the control apparatus 7 to function so as to make the processing system SYS execute the below described operation. The computer program executed by the arithmetic apparatus may be recorded in the memory (namely, a recording medium) of the control apparatus 7, or may be recorded in any recording medium (for example, a hard disk or a semiconductor memory) that is built in the control apparatus 7 or that is attachable to the control apparatus 7. Alternatively, the arithmetic apparatus may download the computer program that should be executed from an apparatus disposed at the outside of the control apparatus 7 through a network interface.

The control apparatus 7 may not be disposed in the processing system SYS, and may be disposed at the outside of the processing system SYS as a server or the like. In this case, the control apparatus 7 may be connected to the processing system SYS through a wired and/or wireless network (alternatively, a data bus and/or a communication line). In this case, the control apparatus 7 and the processing system SYS may be configured to transmit and receive various information through the network. Moreover, the control apparatus 7 may be configured to transmit an information such as a command and a control parameter to the processing system SYS through the network. The processing system SYS may include a reception apparatus that receives the information such as the command and the control parameter from the control apparatus 7 through the network. Alternatively, a first control apparatus that performs a part of the process performed by the control apparatus 7 may be disposed in the processing system SYS and a second control apparatus that performs another part of the process performed by the control apparatus 7 may be disposed at the outside of the processing system SYS.

Note that the recording medium recording therein the computer program that should be executed by the arithmetic apparatus may include an optical disc, an optical-magnetic disc, a semiconductor memory such as a USB memory, and another medium that is configured to store the program. The recording medium may include a device that is configured to record the computer program. Moreover, various processes or functions included in the computer program may be realized by a logical process block that is implemented in the control apparatus 7 by the control apparatus 7 (namely, a computer) executing the computer program, may be realized by a hardware such as a predetermined gate array (a FPGA, an ASIC) of the control apparatus 7, or may be realized in a form in which the logical process block and a partial hardware module that realizes an partial element of the hardware are combined.

(2) Processing Operation Performed by Processing System Sys

Next, a processing operation performed by the processing system SYS (namely, a processing operation for processing the workpiece W) will be described. Especially, in the below described description, a processing operation for forming a concave part PH depressed from the surface of the workpiece W at the workpiece W having a flat-plate-like shape will be described as illustrated in FIG. 5A that is a planar view illustrating one example of the processed workpiece W and FIG. 5B that is a cross-sectional view illustrating one example of the processed workpiece W for convenience of description. Especially, in an example illustrated in FIG. 5A and FIG. 5B, a processing operation for forming the concave part PH having a square-hole-like shape at the workpiece W having the flat-plate-like shape will be described. However, the processing system SYS may perform a processing operation that is different from the processing operation for forming the concave part PH. The processing system SYS may perform a processing operation for forming a shape or a structure that is different from the concave part PH.

In order to process the workpiece W, firstly, the workpiece W is placed on the stage 32. Then, the measurement apparatus 2 measures the workpiece W. In this case, the measurement shot area MSA may be set to be a relatively wide area (for example, an area wider than the measurement shot area MSA in a below described fine measurement). Thus, in the below described description, the measurement performed by the measurement apparatus 2 after the workpiece W is placed on the stage 32 is referred to as a "wide area measurement".

Then, the control apparatus 7 generates three-dimensional model data of the workpiece based on a wide area measurement information indicating a result of the wide area measurement of the workpiece W by the measurement apparatus 2. Hereinafter, for the convenience of description, the three-dimensional model data based on the wide area measurement information is referred to as "wide area 3D model data". Incidentally, when the workpiece W the wide area 3D model data of which is already generated is newly mounted on the stage 32, the measurement apparatus 2 may not perform the wide area measurement. In this case, the following operation may be performed by using the wide area 3D model data already generated (for example, data generated by using a 3D-CAD).

Furthermore, the control apparatus 7 determines, based on the wide area measurement information, a position of the workpiece W in a coordinate system that is used when the stage 32 moves (hereinafter, a "stage coordinate system"). Specifically, the measurement apparatus 2 measures a fiducial mark that is formed in advance on a surface of the stage 32 (alternatively, another member such as the plate surface 31) in performing the wide area measurement. An information related to a measurement result of the fiducial mark include an information related to a position of the fiducial mark. Thus, the control apparatus 7 may determine a positional relationship between the fiducial mark and the workpiece W based on the wide area measurement information including the measurement result of the fiducial mark Furthermore, since the fiducial mark is formed on the stage 32 (namely, a positional relationship between the fiducial mark and the stage 32 is fixed), the control apparatus 7 may determine the position of the fiducial mark in the stage coordinate system based on an information related to the position (namely, the position in the stage coordinate system) of the stage 32 measured by the position measurement device 34 and an information related to the positional relationship between the fiducial mark and the stage 32. As a result, the control apparatus 7 may determine the position of the workpiece W in the stage coordinate system based on the information related to the position of the fiducial mark in the stage coordinate system and the information related to the positional relationship between the fiducial mark and the workpiece W measured by the wide area measurement. Note that the measurement apparatus 2 may measure a feature point of the stage 32 instead of measuring the fiducial mark Then, the control apparatus 7 set a processing target area TA of the workpiece W that should be actually processed by the processing apparatus 1. For example, the control apparatus 7 may set the processing target area TA based on an instruction (for example, an instruction for setting the processing target area TA on a three-dimensional model) of a user of the processing system SYS who looks the three-dimensional model of the workpiece W based on the wide area 3D model data. Alternatively, for example, the control apparatus 7 may determine a part of the workpiece W that satisfies a predetermined condition and may set the processing target area TA including the determined part. Note that, in the below described description, an example in which the processing target area TA is set at a central part of the workpiece W will be described as illustrated in FIG. 6A that is a planar view illustrating one example of a positional relationship between the processing target area TA and the workpiece W and FIG. 6B that is a cross-sectional view illustrating one example of the positional relationship between the processing target area TA and the workpiece W.

Then, the measurement apparatus 2 measures a processing target part W_target of the workpiece W that is a part included in the processing target area TA. Note that the processing target part W_target is same as a part of the workpiece W that should be removed to form the concave part PH in the example illustrated in FIG. 6A and FIG. 6B. In this case, a measurement resolution for measuring the processing target part W_target may be higher than a measurement resolution of the above described wide area measurement. Thus, the measurement of the processing target part W_target is referred to as a "fine measurement" in the present embodiment, for convenience of description. However, the fine measurement may not be performed.

After the fine measurement of the workpiece W is performed, the control apparatus 7 generates a three-dimensional model data of the processing target part W_target based on a fine measurement information indicating a result of the fine measurement. Hereinafter, the three-dimensional model data based on the fine measurement information is referred to as a "fine 3D model data", for convenience of description. Incidentally, when the workpiece W the fine 3D model data of which is already generated is newly mounted on the stage 32, the measurement apparatus 2 may not perform the fine measurement. In this case, the following operation may be performed by using the fine 3D model data already generated (for example, data generated by using a 3D-CAD). Alternatively, the three-dimensional model data of the processing target part W_target may be generated based on the above described wide area measurement information.

Then, the control apparatus 7 controls the processing apparatus 1, the stage driving system 33 and the driving system 5 based on the fine 3D model data (alternatively, the wide area 3D model data when the fine measurement is not performed) to perform the removal processing of the workpiece W to thereby form the concave part PH. Next, with reference to FIG. 7 to FIG. 23, the removal processing of the workpiece W that is performed to form the concave part PH will be described.

Firstly, as illustrated in FIG. 7A to FIG. 7B, the control apparatus 7 controls the stage driving system 33 and/or the driving system 5 to move the stage 32 and/or the processing apparatus 1 so that the processing shot area PSA is set on a first surface WS #1 of a surface WS of the processing target part W_target the position and the shape of which is determined by the fine 3D model data. The first surface WS #1 has a same size as the processing shot area PSA or smaller than the processing shot area PSA in a planar view. Typically, the first surface WS #1 contacts with an outer edge of the surface WS the processing target part W_target. The first surface WS #1 is a part of the surface WS of the processing target part W_target. Namely, in the below described description, an example in which the surface WS of the processing target part W_target is larger than the processing shot area PSA will be described. In other words, in the below described description, an example in which the processing target part W_target is divided into a plurality of unit processing target part W_unit based on a size of the processing shot area PSA and the plurality of unit processing target pert W_unit are processed in sequence will be described. Thus, a first unit processing target part W_unit #1 is firstly removed from the processing target part W_target in a state where the processing shot area PSA is set on the first surface WS #1.

Then, the control apparatus 7 controls the processing apparatus 1 to sweep the first surface WS #1 on which the processing shot area PSA is set with the processing light EL. Specifically, as illustrated in FIG. 8 that is a planar view illustrating a moving trajectory of the target irradiation area EA on the surface WS of the processing target part W_target, the control apparatus 7 alternately repeats a scan operation for controlling the Galvano mirror 122 to move the target irradiation area EA on the first surface WS #1 along the Y axis direction (for example, from the −Y side to the +Y side) while irradiating the target irradiation area EA with the processing light EL and a step operation for controlling the Galvano mirror 122 to move the target irradiation area EA by a predetermined moving distance on the first surface WS #1 along the X axis direction without irradiating the target irradiation area EA with the processing light EL. In this case, the light concentration position (namely, a condensed position) of the processing light EL may be set on the first surface WS #1 or near the first surface WS #1. Since the processing light EL is emitted during a period in which the scan operation is performed, a unit removal part URP that extends along the Y axis direction and that has a predetermined thickness along the Z axis direction is removed from the processing target part W_target by the scan operation as illustrated in FIG. 9A that is a planar view illustrating the processing target part W_target on which the scan operation is performed one time. Furthermore, since the scan operation is repeated, a plurality of unit removal parts URP that are arranged along the X axis direction are removed in sequence as illustrated in FIG. 9B that is a planar view illustrating the processing target part W_target on which the scan operation is performed a plurality of times. As a result, as illustrated in FIG. 10, a layered part (namely, a layered structural object) SL, which corresponds to an aggregation of the plurality of unit removal parts URP removed by one-time sweeping of the processing shot area PSA with the processing light EL, is removed from the processing target part W_target. Specifically, as illustrated in FIG. 10, a layered part SL #1_1 the surface of which is the first surface WS #1 is removed.

As a result of the layered part SL #1_1 being removed, an exposed surface WS #1_1 that newly exposes to face the processing apparatus 1 is formed at the processing target part W_target. Here, the processing shot area PSA is set on the exposed surface WS #1_1 because the processing apparatus 1 and the stage 32 have not moved. In this case, as illustrated in FIG. 11, the processing apparatus 1 newly remove a layered part SL #1_2 that has been adjacent to the −Z side of the layered part SL #1_1 by sweeping at least a part of the exposed surface WS #1_1 with the processing light EL, as with the case where the layered part SL #1_1 is removed by sweeping the first surface WS #1 with the processing light EL. Namely, the processing apparatus 1 newly remove the layered part SL #1_2 by sweeping a surface of the layered part SL #1_2 including at least a part of the exposed surface WS #1_1 with the processing light EL.

Specifically, the control apparatus 7 firstly controls the optical system 12 (especially, the focus lens 121) so that the light concentration position of the processing light EL that has been set on the first surface WS #1 or near the first surface WS #1 is set on the exposed surface WS #1_1 or near the exposed surface WS #1_2. Namely, the control apparatus 7 controls the optical system 12 (especially, the focus lens 121) so that the light concentration position of the processing light EL for removing the layered part SL #1_2 is away from the surface WS of the processing target part W_target more than the light concentration position of the processing light EL for removing the layered part SL #1_1 is. Then, the processing apparatus 1 removes the layered part SL #1_2 by alternately repeating the scan operation for moving the target irradiation area EA on the exposed surface WS #1_1 along the Y axis direction while irradiating the target irradiation area EA with the processing light EL and the step operation for moving the target irradiation area EA by the predetermined moving distance on the exposed surface WS #1_1 along the X axis direction without irradiating the target irradiation area EA with the processing light EL.

However, as illustrated in FIG. 11, the processing apparatus 1 irradiates the exposed surface WS #1_1 with the processing light EL so that a moving range of the processing light EL for removing the layered part SL #1_2 is smaller than a moving range (namely, a sweeping range) of the processing light EL for removing the layered part SL #1_1. Namely, the processing apparatus 1 irradiates the exposed surface WS #1_1 with the processing light EL so that a moving range of the target irradiation area EA for removing the layered part SL #1_2 is smaller than a moving range of the processing light EL for removing the layered part SL #1_1.

Especially, the processing apparatus 1 irradiates the exposed surface WS #1_1 with the processing light EL so that a moving range of the processing light EL for removing the layered part SL #1_2 along a scan direction is smaller than a moving range of the processing light EL for removing the layered part SL #1_1 along the scan direction (alternatively, any desired direction, the same applies to the below described description). Namely, the processing apparatus 1 irradiates the exposed surface WS #1_1 with the processing light EL so that a moving range of the target irradiation area EA for removing the layered part SL #1_2 along the scan direction is smaller than a moving range of the processing light EL for removing the layered part SL #1_1 along the scan direction. Note that the scan direction means a sweeping direction of the processing light EL (namely, a moving direction of the target irradiation area EA) by the scan operation. In an example illustrated in FIG. 11, the scan direction is the Y axis direction. Thus, the processing apparatus 1 irradiates the exposed surface WS #1_1 with the processing light EL so that the moving range of the processing light EL for removing the layered part SL #1_2 along the Y axis direction is smaller than the moving range of the processing light EL for removing the layered part SL #1_1 along the Y axis direction. As a result, a size of the removed layered part SL #1_2 is smaller than a size of the removed layered part SL #1_1. Namely, the size of the removed layered part SL #1_1 is larger than a size of the removed layered part SL #1_2. Specifically, the size of the layered part SL #1_1 along the scan direction (the Y axis direction in the example illustrated in FIG. 11) is larger than the size of the layered part SL #1_2 along the scan direction.

As one example, a position of an end part at the −Y side (namely, a rear side along the sweeping direction of the processing light EL by the scan direction) of the moving range of the processing light EL for removing the layered part SL #1_2 may be same as a position of an end part at the −Y side of the moving range of the processing light EL for removing the layered part SL #1_1 along the Y axis direction (namely, the scan direction). On the other hand, a position of an end part at the +Y side (namely, a front side along the sweeping direction of the processing light EL by the scan direction) of the moving range of the processing light EL for removing the layered part SL #1_2 may be located at a position that is away toward the −Y side from a position of an end part at the +Y side of the moving range of the processing light EL for removing the layered part SL #1_1 along the Y axis direction. As a result, the moving range of the processing light EL for removing the layered part SL #1_2 along the scan direction is smaller than the moving range of the processing light EL for removing the layered part SL #1_1 along the scan direction. In this case, as illustrated in FIG. 11, a position of an end part ES #1_2 at the −Y side of the layered part SL #1_2 is same as a position of an end part ES #1_1 at the −Y side of the layered part SL #1_1 along the Y axis direction (namely, the scan direction). On the other hand, a position of an end part EE #1_2 at the +Y side of the layered part SL #1_2 is located at a position that is away toward the −Y side from a position of an end part EE #1_1 at the +Y side of the layered part SL #1_1 along the Y axis direction. Namely, the size of the layered part SL #1_1 along the scan direction (the Y axis direction in the example illustrated in FIG. 11) is larger than the size of the layered part SL #1_2 along the scan direction. Note that a state where "a position of a first end part is same as a position of a second end part" in the present embodiment includes not only a state where "the position of the first end part is exactly same as the position of the second end part literally" but also a state where "the position of the first end part is not exactly same as the position of the second end part but the difference between both positions is so small that both positions are allowed to be regarded to be substantially same as each other"

Then, the same operation (namely, an operation for removing the layered part SL) is repeated until a groove having a depth that is same as a depth of the concave part PH is formed. Namely, every time a layered part SL #1_k (note that k is an integer equal to or larger than 1) is removed, the processing apparatus 1 sets the light concentration position of the processing light EL on an exposed surface WS #1_k or near the exposed surface WS #1_k that is newly formed by removing the layered part SL #1_k, and alternately repeats the scan operation and the step operation on at least a part of the exposed surface WS #1_k. As a result, a layered part SL #1_k+1 that has been adjacent to the −Z side of the layered part SL #1_k is removed. Namely, the processing apparatus 1 newly removes the layered part SL #1_k+1 by sweeping the surface of the layered part SL #1_k+1 including at least a part of the exposed surface WS #1_k with the processing light EL.

In this case, as described above, the processing apparatus 1 irradiates the first unit processing target part W_unit #1 with the processing light EL so that the moving range of the processing light EL for removing the layered part SL #1_k+1 is smaller than the moving range of the processing light EL for removing the layered part SL #1_k. Namely, as illustrated in FIG. 12 that illustrates the moving range of the processing light EL in the processing shot area PSA when the first unit processing target part W_unit #1 is removed, the processing apparatus 1 irradiates the first unit processing target part W_unit #1 with the processing light EL so that the moving range of the processing light EL along the scan direction becomes smaller every time the layered part SL #1_k is removed. For example, the processing apparatus 1 irradiates the exposed surface WS #1_k with the processing light EL so that the end part at the +Y side of the moving range of the processing light EL along the scan direction moves toward the −Y side every time the layered part SL #1_k is removed. Incidentally, it can be said that FIG. 12 illustrates a range in which the removal processing is performed in the processing shot area PSA, because the removal processing is performed in an area that is irradiated with the processing light EL. Namely, it can be said that the processing apparatus 1 irradiates the first unit processing target part W_unit #1 with the processing light EL so that the area in which the removal processing is performed by the processing light becomes smaller every time the layered part SL #1_k is removed.

As a result, as illustrated in FIG. 13, the first unit processing target part W_unit #1 including the plurality of layered parts SL (the layered part SL #1_1 to a layered part SL #1_6 in an example illustrated in FIG. 13) is removed from the processing target part W_target. Namely, the first unit processing target part W_unit #1 of the processing target part W_target that has been located below at least a part of the first surface WS #1 is removed.

Then, as illustrated in FIG. 14, the processing apparatus 1 removes a second unit processing target part W_unit #2 of the processing target part W_target adjacent to the first unit processing target part W_unit #1. The second unit processing target part W_unit #2 is typically adjacent to the first unit processing target part W_unit #1.

The second unit processing target part W_unit #2 include a plurality of layered parts SL that are respectively adjacent to the plurality of layered parts SL included in the first unit processing target part W_unit #1. Typically, the second unit processing target part W_unit #2 include the plurality of layered parts SL that are respectively adjacent to the plurality of layered parts SL included in the first unit processing target part W_unit #1 along the scan direction. In an example illustrated in FIG. 14, the second unit processing target part W_unit #2 includes a layered part SL #2_1 adjacent to the layered part SL #1_1 along the scan direction, a layered part SL #2_2 adjacent to the layered part SL #1_2 along the scan direction, a layered part SL #2_3 adjacent to the layered part SL #1_3 along the scan direction, a layered part SL #2_4 adjacent to the layered part SL #1_4 along the scan direction, a layered part SL #2_5 adjacent to the layered part SL #1_5 along the scan direction and a layered part SL #2_6 adjacent to the layered part SL #1_6 along the scan direction. Thus, the processing apparatus 1 removes the layered parts SL #2_1 to SL #2_6 in sequence in order to remove the second unit processing target part W_unit #2.

In the example illustrated in FIG. 14, the removal of whole of the processing target part W_target is not completed even when the second unit processing target part W_unit #2 is removed. In this case, sizes (especially, sizes along the scan direction) of the plurality of layered parts SL of the second unit processing target part W_unit #2 may be same as one another. On the other hand, when the removal of whole of the processing target part W_target is completed by removing the second unit processing target part W_unit #2, the sizes (especially, the sizes along the scan direction) of the plurality of layered parts SL of the second unit processing target part W_unit #2 may be different from one another, as described later when a third unit processing target part W_unit #3 is removed.

In order to remove the second unit processing target part W_unit #2, the control apparatus 7 controls the stage driving system 33 and/or the driving system 5 to move the stage 32 and/or the processing apparatus 1 so that the second unit processing target part W_unit #2 is irradiated with the processing light EL. In this case, as illustrated in FIG. 14, the control apparatus 7 typically controls the stage driving system 33 and/or the driving system 5 to move the stage 32 and/or the processing apparatus 1 so that a second surface WS #2 of the surface WS of the processing target part W_target is included in the processing shot area PSA. The second surface WS #2 is a part of the surface WS of the processing target part W_target and is adjacent to the first surface WS #1. The second surface WS #2 is typically adjacent to the first surface WS #1 along the scan direction. Furthermore, as illustrated in FIG. 14, the control apparatus 7 moves the stage 32 and/or the processing apparatus 1 so that a position of an end part E_PSA at the −Y side (namely, a first unit processing target part W_unit #1 side) of the processing shot area PSA is same as a position of an end part E #2 at the −Y side of the second unit processing target part W_unit #2 or is away toward the −Y side from the position of the end part E #2 along the scan direction. Note that the position of the end part E #2 at the −Y side of the second unit processing target part W_unit #2 is same as a position of an end part at the −Y side of the layered part SL #2_6.

Then, the control apparatus 7 controls the processing apparatus 1 to remove the second unit processing target part W_unit #2. Specifically, the control apparatus 7 controls the processing apparatus 1 to remove the second unit processing target part W_unit #2 by removing the layered parts #2_1 to #2_6.

Specifically, the control apparatus 7 firstly controls the optical system 12 (especially, the focus lens 121) so that the light concentration position of the processing light EL is set on the second surface WS #2 (namely, a surface of the second unit processing target part W_unit #2, and a surface of the layered part SL #2_1) or near the second surface WS #2. Then, the processing apparatus 1 alternately repeats the scan operation for moving the target irradiation area EA on the second surface WS #2 along the Y axis direction while irradiating the target irradiation area EA with the processing light EL and the step operation for moving the target irradiation area EA by the predetermined moving distance on the second surface WS #2 along the X axis direction without irradiating the target irradiation area EA with the processing light EL. As a result, as illustrated in FIG. 15, the layered part SL #2_1 is removed.

As a result of the layered part SL #2_1 being removed, an exposed surface WS #2_1 that newly exposes to face the processing apparatus 1 is formed at the processing target part W_target. Even in this case, as illustrated in FIG. 16, the processing apparatus 1 newly remove the layered part SL #2_2 that has been adjacent to the −Z side of the layered part SL #2_1 by sweeping at least a part of the exposed surface WS #2_1 with the processing light EL, as with the case where the first unit processing target part W_unit #1 is removed. Namely, the processing apparatus 1 newly remove the layered part SL #2_2 by sweeping a surface of the layered part SL #2_2 including at least a part of the exposed surface WS #2_1 with the processing light EL. Specifically, the control apparatus 7 firstly controls the optical system 12 (especially, the focus lens 121) so that the light concentration position of the processing light EL that has been set on the second surface WS #2 or near the second surface WS #2 is set on the exposed surface WS #2_1 or near the exposed surface WS #2_1. Namely, the control apparatus 7 controls the optical system 12 (especially, the focus lens 121) so that the light concentration position of the processing light EL for removing the layered part SL #2_2 is away from the surface WS of the processing target part W_target more than the light concentration position of the processing light EL for removing the layered part SL #2_1 is. Then, the processing apparatus 1 removes the layered part SL #2_2 by alternately repeating the scan operation and the step operation on at least a part of the exposed surface WS #2_1.

Here, as described above, since the removal of whole of the processing target part W_target is not completed even when the second unit processing target part W_unit #2 is removed, the sizes (especially, the sizes along the scan direction) of the plurality of layered parts SL of the second unit processing target part W_unit #2 are same as one another. Thus, the processing apparatus 1 irradiates the second unit processing target part W_unit #2 with the processing light EL so that a size (especially, a size along the scan direction, the same applies to the below described description) of the moving range of the processing light EL for removing the layered part SL #2_1 is same as a size of the moving range of the processing light EL for removing the layered part SL #2_2. The processing apparatus 1 irradiates the second unit processing target part W_unit #2 with the processing light EL so that a size of the moving range of the target irradiation area EA for removing the layered part SL #2_1 is same as a size of the moving range of the target irradiation area EA for removing the layered part SL #2_2.

However, as described above, along the scan direction, the position of the end part EE #1_2 at the +Y side of the layered part SL #1_2 that is adjacent to the layered part SL #2_2 is located at a position that is away toward the −Y side from the position of the end part EE #1_1 at the +Y side of the layered part SL #1_1 that is adjacent to the layered part SL #2_1. As a result, as illustrated in FIG. 16, a position of an end part ES #2_2 at the −Y side of the layered part SL #2_2 is located at the position that is away toward the −Y side from a position of an end part ES #2_1 at the −Y side of the layered part SL #2_1. In this case, since the size of the layered part SL #2_1 is same as the size of the layered part SL #2_2, a position of an end part EE #2_2 at the +Y side of the layered part SL #2_2 is located at a position that is away toward the −Y side from a position of an end part EE #2_1 at the +Y side of the layered part SL #2_1. In order to remove this layered part SL #2_2, the processing apparatus 1 irradiates the second unit processing target part W_unit #2 with the processing light EL so that (i) a position of an end part at the −Y side of the moving range of the processing light EL for removing the layered part SL #2_2 is located at a position that is away toward the −Y side from a position of an end part at the −Y side of the moving range of the processing light EL for removing the layered part SL #2_1 and (ii) a position of an end part at the +Y side of the moving range of the processing light EL for removing the layered part SL #2_2 is located at a position that is away toward the −Y side from a position of an end part at the +Y side of the moving range of the processing light EL for removing the layered part SL #2_1, along the Y axis direction (namely, the scan direction).

Then, the same operation (namely, an operation for removing the layered part SL) is repeated until a groove having a depth that is same as the depth of the concave part PH is formed. Namely, every time the layered part SL #2_k is removed, the processing apparatus 1 sets the light con centration position of the processing light EL on an exposed surface WS #2_$k$ or near the exposed surface WS #2_$k$ that is newly formed by removing the layered part SL #2_$k$, and alternately repeats the scan operation and the step operation on at least a part of the exposed surface WS #2_$k$. As a result, the layered part SL #2_$k$+1 that has been adjacent to the −Z side of the layered part SL #2_$k$ is removed. Namely, the processing apparatus 1 newly removes the layered part SL #2_$k$+1 by sweeping the surface of the layered part SL #2_$k$+1 including at least a part of the exposed surface WS #2_$k$ with the processing light EL.

In this case, as described above, the processing apparatus 1 irradiates the second unit processing target part W_unit #2 with the processing light EL so that the moving range of the processing light EL for removing the layered part SL #2_$k$ is same as the moving range of the processing light EL for removing the layered part SL #2_$k$+1 along the Y axis direction (namely, the scan direction). Furthermore, the processing apparatus 1 irradiates at least a part of the exposed surface WS #2_$k$ with the processing light EL so that (i) the position of the end part at the −Y side of the moving range of the processing light EL for removing the layered part SL #2_$k$+1 is located at the position that is away toward the −Y side from the position of the end part at the −Y side of the moving range of the processing light EL for removing the layered part SL #2_$k$ and (ii) the position of the end part at the +Y side of the moving range of the processing light EL for removing the layered part SL #2_$k$+1 is located at the position that is away toward the −Y side from the position of the end part at the +Y side of the moving range of the processing light EL for removing the layered part SL #2_$k$, along the Y axis direction. Namely, as illustrated in FIG. 17 that illustrates the moving range of the processing light EL in the processing shot area PSA when the second unit processing target part W_unit #2 is removed, the processing apparatus 1 emits the processing light EL so that the size of the moving range of the processing light EL along the scan direction is kept to be constant and the moving range of the processing light moves (typically, moves along the scan direction) every time the layered part SL #2_$k$ is removed.

As a result, as illustrated in FIG. 18, the second unit processing target part W_unit #2 including the plurality of layered parts SL (the layered part SL #2_1 to the layered part SL #2_6 in an example illustrated in FIG. 18) is removed from the processing target part W_target.

Then, as illustrated in FIG. 19, the processing apparatus 1 removes the third unit processing target part W_unit #3 of the processing target part W_target adjacent to the second unit processing target part W_unit #2. The third unit processing target part W_unit #3 is typically adjacent to the second unit processing target part W_unit #2.

The third unit processing target part W_unit #3 include a plurality of layered parts SL that are respectively adjacent to the plurality of layered parts SL included in the second unit processing target part W_unit #2. Typically, the third unit processing target part W_unit #3 include the plurality of layered parts SL that are respectively adjacent to the plurality of layered parts SL included in the second unit processing target part W_unit #2 along the scan direction. In an example illustrated in FIG. 19, the third unit processing target part W_unit #3 includes a layered part SL #3_1 adjacent to the layered part SL #2_1 along the scan direction, a layered part SL #3_2 adjacent to the layered part SL #2_2 along the scan direction, a layered part SL #3_3 adjacent to the layered part SL #2_3 along the scan direction, a layered part SL #3_4 adjacent to the layered part SL #2_4 along the scan direction, a layered part SL #3_5 adjacent to the layered part SL #2_5 along the scan direction and a layered part SL #3_6 adjacent to the layered part SL #2_6 along the scan direction. Thus, the processing apparatus 1 removes the layered parts SL #3_1 to SL #3_6 in sequence in order to remove the third unit processing target part W_unit #3.

In an example illustrated in FIG. 19, the removal of whole of the processing target part W_target is completed even when the third unit processing target part W_unit #3 is removed. In this case, sizes (especially, sizes along the scan direction) of the plurality of layered parts SL of the third unit processing target part W_unit #3 may be different from one another. On the other hand, when the removal of whole of the processing target part W_target is not completed even when the third unit processing target part W_unit #3 is removed (for example, another unit processing target part W_unit that is adjacent to the third unit processing target part W_unit #3 along the scan direction should be removed), the sizes (especially, the sizes along the scan direction) of the plurality of layered parts SL of the third unit processing target part W_unit #3 may be same as one another. Namely, in the present embodiment, when the plurality of unit processing target parts W_unit that are arranged along the scan direction are removed in sequence, (i) the unit processing target part W_unit that is removed first is removed in a removal aspect that is same as that of the above described first unit processing target part W_unit #1, (ii) the unit processing target part W_unit that is removed last is removed in a removal aspect that is same as that of the third unit processing target part W_unit #3, and (iii) the other unit processing target part W_unit is removed in a removal aspect that is same as that of the above described second unit processing target part W_unit #2. Namely, (i) the processing light EL is controlled so that the size of the layered part SL along the scan direction becomes smaller every time the layered part SL is removed in order to remove the unit processing target part W_unit that is removed first, (ii) the processing light EL is controlled so that the size of the layered part SL along the scan direction becomes larger every time the layered part SL is removed in order to remove the unit processing target part W_unit that is removed last, and (iii) the processing light EL is controlled so that the size of the layered part SL along the scan direction is kept to be constant and the area in which the layered part SL is removed moves along the scan direction every time the layered part SL is removed in order to remove the other unit processing target part W_unit.

In order to remove the third unit processing target part W_unit #3, the control apparatus 7 controls the stage driving system 33 and/or the driving system 5 to move the stage 32 and/or the processing apparatus 1 so that the third unit processing target part W_unit #3 is irradiated with the processing light EL. In this case, as illustrated in FIG. 19, the control apparatus 7 typically controls the stage driving system 33 and/or the driving system 5 to move the stage 32 and/or the processing apparatus 1 so that a third surface WS #3 of the surface WS of the processing target part W_target is included in the processing shot area PSA. The third surface WS #3 is a part of the surface WS of the processing target part W_target and is adjacent to the second surface WS #2. The third surface WS #3 is typically adjacent to the second surface WS #2 along the scan direction. Furthermore, as illustrated in FIG. 19, the control apparatus 7 moves the stage 32 and/or the processing apparatus 1 so that the position of the end part E_PSA at the −Y side (namely, a second unit processing target part W_unit #2 side) of the processing shot area PSA is same as a position of an end part E #3 at the −Y side of the third unit processing target part W_unit #3 or is away toward the −Y side from the position of the end part E #3 along the scan direction. Note that the position of the end part E #3 at the −Y side of the third unit processing target part W_unit #3 is same as a position of an end part at the −Y side of the layered part SL #3_6.

Then, the control apparatus 7 controls the processing apparatus 1 to remove the third unit processing target part W_unit #2. Specifically, the control apparatus 7 controls the processing apparatus 1 to remove the third unit processing target part W_unit #3 by removing the layered parts #3_1 to #3_6.

Specifically, the control apparatus 7 firstly controls the optical system 12 (especially, the focus lens 121) so that the light concentration position of the processing light EL is set on the third surface WS #3 (namely, a surface of the third unit processing target part W_unit #3, and a surface of the layered part SL #3_1) or near the third surface WS #3. Then, the processing apparatus 1 alternately repeats the scan operation for moving the target irradiation area EA on the third surface WS #3 along the Y axis direction while irradiating the target irradiation area EA with the processing light EL and the step operation for moving the target irradiation area EA by the predetermined moving distance on the third surface WS #3 along the X axis direction without irradiating the target irradiation area EA with the processing light EL. As a result, as illustrated in FIG. 20, the layered part SL #3_1 is removed.

As a result of the layered part SL #3_1 being removed, an exposed surface WS #3_1 that newly exposes to face the processing apparatus 1 is formed at the processing target part W_target. Even in this case, as illustrated in FIG. 21, the processing apparatus 1 newly remove the layered part SL #3_2 that has been adjacent to the −Z side of the layered part SL #3_1 by sweeping at least a part of the exposed surface WS #3_1 with the processing light EL, as with the case where the first unit processing target part W_unit #1 and the second unit processing target part W_unit are removed. Namely, the processing apparatus 1 newly remove the layered part SL #3_2 by sweeping a surface of the layered part SL #3_2 including at least a part of the exposed surface WS #3_1 with the processing light EL. Specifically, the control apparatus 7 firstly controls the optical system 12 (especially, the focus lens 121) so that the light concentration position of the processing light EL that has been set on the third surface WS #3 or near the third surface WS #3 is set on the exposed surface WS #3_1 or near the exposed surface WS #3_1. Namely, the control apparatus 7 controls the optical system 12 (especially, the focus lens 121) so that the light concentration position of the processing light EL for removing the layered part SL #3_2 is away from the surface WS of the processing target part W_target more than the light concentration position of the processing light EL for removing the layered part SL #3_1 is. Then, the processing apparatus 1 removes the layered part SL #3_2 by alternately repeating the scan operation and the step operation on at least a part of the exposed surface WS #3_1.

Here, as described above, since the removal of whole of the processing target part W_target is completed when the third unit processing target part W_unit #2 is removed, the sizes (especially, the sizes along the scan direction) of the plurality of layered parts SL of the third unit processing target part W_unit #3 are different from one another. Specifically, as described above, the position of the end part EE #2_2 at the +Y side of the layered part SL #2_2 that is adjacent to the layered part SL #3_2 is located at the position that is away toward the −Y side from the position of the end part EE #2_1 at the +Y side of the layered part SL #2_1 that is adjacent to the layered part SL #3_1. As a result, as illustrated in FIG. 21, a position of an end part ES #3_2 at the −Y side of the layered part SL #3_2 is located at a position that is away toward the −Y side from a position of an end part ES #3_1 at the −Y side of the layered part SL #3_1. On the other hand, since the concave part PH having the square-hole-like shape is formed, a position of an end part EE #3_2 at the +Y side of the layered part SL #3_2 is same as a position of an end part EE #3_1 at the −Y side of the layered part SL #3_1 along the scan direction. As a result, the size of the layered part SL #3_2 is larger than the size of the layered part SL #3_1 along the scan direction.

In order to remove this layered part SL #3_2, the processing apparatus 1 irradiates the exposed surface WS #3_1 with the processing light EL so that the moving range of the processing light EL for removing the layered part SL #3_2 is larger than the moving range (especially, the moving range along the scan direction) of the processing light EL for removing the layered part SL #3_1. The processing apparatus 1 irradiates the exposed surface WS #3_1 with the processing light EL so that the moving range of the target irradiation area EA for removing the layered part SL #3_2 is larger than the moving range of the target irradiation area EA for removing the layered part SL #3_1. Specifically, the processing apparatus 1 irradiates the exposed surface WS #3_1 with the processing light EL so that (i) a position of an end part at the −Y side of the moving range of the processing light EL for removing the layered part SL #3_2 is located at a position that is away toward the −Y side from a position of an end part at the −Y side of the moving range of the processing light EL for removing the layered part SL #3_1 and (ii) a position of an end part at the +Y side of the moving range of the processing light EL for removing the layered part SL #3_2 is same as a position of an end part at the +Y side of the moving range of the processing light EL for removing the layered part SL #3_1, along the Y axis direction (namely, the scan direction).

Then, the same operation (namely, an operation for removing the layered part SL) is repeated until a groove having a depth that is same as the depth of the concave part PH is formed. Namely, every time the layered part SL #3_k is removed, the processing apparatus 1 sets the light concentration position of the processing light EL on an exposed surface WS #3_k or near the exposed surface WS #3_k that is newly formed by removing the layered part SL #3_k, and alternately repeats the scan operation and the step operation on at least a part of the exposed surface WS #3_k. As a result, the layered part SL #3_k+1 that has been adjacent to the −Z side of the layered part SL #3_k is removed. Namely, the processing apparatus 1 newly removes the layered part SL #3_k+1 by sweeping the surface of the layered part SL #3_k+1 including at least a part of the exposed surface WS #3_k with the processing light EL.

In this case, as described above, the processing apparatus 1 irradiates the exposure surface WS #3_k with the processing light EL so that the moving range of the processing light EL for removing the layered part SL #3_k+1 is larger than the moving range of the processing light EL for removing the layered part SL #3_k. Furthermore, the processing apparatus 1 irradiates the exposed surface WS #3_k with the processing light EL so that (i) the position of the end part at the −Y side of the moving range of the processing light EL for removing the layered part SL #3_k+1 is located at the position that is away toward the −Y side from the position of the end part at the −Y side of the moving range of the processing light EL for removing the layered part SL #3_k and (ii) the position of the end part at the +Y side of the moving range of the processing light EL for removing the layered part SL #3_*k*+1 is same as the position of the end part at the +Y side of the moving range of the processing light EL for removing the layered part SL #3_*k*, along the Y axis direction (namely, the scan direction). Namely, as illustrated in FIG. 22 that illustrates the moving range of the processing light EL in the processing shot area PSA when the third unit processing target part W_unit #3 is removed, the processing apparatus 1 irradiates the third unit processing target part W_unit #3 with the processing light EL so that the moving range of the processing light EL along the scan direction becomes larger every time the layered part SL #3_*k* is removed.

As a result, as illustrated in FIG. 23, the third unit processing target part W_unit #3 including the plurality of layered parts SL (the layered part SL #3_1 to a layered part SL #3_6 in an example illustrated in FIG. 23) is removed from the processing target part W_target. As a result, the removal of the processing target part W_target is completed, and the concave part PH is formed.

(3) Technical Effect of Processing System Sys

The above described processing system SYS is capable of properly processing the workpiece W. Especially, the processing system SYS is capable of properly processing a border between the plurality of unit processing target parts W_unit included in the processing target part W_target. Next, its reason will be described.

Firstly, the processing system SYS may process one unit processing target part W_unit as a whole at one time (namely, as a whole without dividing it into the plurality of layered parts SL) in order to form the concave part PH at the workpiece W. However, in the present embodiment, the processing apparatus 1 emits the processing light EL along a vertical direction (namely, the Z axis direction), and thus, it is not easy for the processing system SYS to process the workpiece W so that a vertical surface is formed by the irradiation of the processing light EL. Thus, there is a possibility that a wall surface remaining after removing one unit processing target part W_unit as a whole at one time (specifically, a side surface of another unit processing target part W_unit that should be removed next) is inclined with respect to a vertical plane. Furthermore, even when another unit processing target part W_unit is removed after one unit processing target part W_unit, there is a possibility that a wall surface that is inclined with respect to the vertical plane remains. In some case, there is a possibility that a wall part formed by the wall surface remains between one unit processing target part W_unit and another unit processing target part W_unit.

However, in the present embodiment, the processing system SYS firstly removes the plurality of layered parts SL that are included in each processing target part W_unit and that are relatively thin in order to remove each unit processing target part W_unit. Thus, the wall surface formed by removing each unit processing target part W_unit is an aggregation of a plurality of micro wall surfaces that are formed by the plurality of layered parts SL in sequence, respectively. Thus, even when the micro wall surface itself is inclined with respect to the vertical plane, an inclination of whole of the wall surface that is the aggregation of plurality of micro wall surfaces is sufficiently small. Furthermore, a border between the plurality of unit processing target parts W_unit is processed so that a border surface between the plurality of unit processing target parts W_unit has a stepwise shape that is substantially inclined with respect to the vertical plane, because the plurality of layered parts SL (for example, the end parts of the plurality of layered parts SL) that are removed in sequence are away from one another along the scan direction. Thus, the processing system SYS may properly process the border surface having the stepwise shape that are purposely formed so that the wall part does not remain. This is because a shape and a size of the border surface that is formed to have the stepwise shape by the processing system SYS purposely is known to the processing system SYS, and thus, the processing system SYS is capable of properly processing the border surface having the known shape and size so that the wall part does not remain. As a result, the processing system SYS is capable of properly processing the border between the plurality of unit processing target parts W_unit. Specifically, the processing system SYS is capable of processing the workpiece W so that a structural object (for example, a wall-shaped structural object) that cannot be removed does not remain between the plurality of unit processing target parts W_unit.

(4) Modified Example

In the above described description, the processing operation for removing the plurality of unit processing target parts W_unit, which are arranged along the scan direction, in sequence is described. On the other hand, the processing system SYS may remove the plurality of unit processing target parts W_unit, which are arranged along a step direction that is a moving direction (the X axis direction in the above described example) of the target irradiation area EA by the step operation, in sequence, in addition to or instead of removing the plurality of unit processing target parts W_unit, which are arranged along the scan direction, in sequence. In this case, the processing system SYS may remove the plurality of unit processing target parts W_unit that are arranged along the step direction in sequence in a same manner as the case where the plurality of unit processing target parts W_unit that are arranged along the scan direction are removed in sequence. Specifically, when the plurality of unit processing target parts W_unit that are arranged along the step direction are removed in sequence, the processing system SYS may (i) control the processing light EL so that the moving range of the processing light EL along the step direction becomes smaller every time the layered part SL is removed in order to remove the unit processing target part W_unit that is removed first, (ii) control the processing light EL so that the moving range of the processing light EL along the step direction becomes larger every time the layered part SL is removed in order to remove the unit processing target part W_unit that is removed last and (iii) control the processing light EL so that the size of the moving range of the processing light EL along the step direction is kept to be constant and the moving range of the processing light EL moves along the step direction every time the layered part SL is removed in order to remove the other unit processing target part W_unit. The processing system SYS may (i) control the processing light EL so that the size of the layered part SL along the step direction becomes smaller every time the layered part SL is removed in order to remove the unit processing target part W_unit that is removed first, (ii) control the processing light EL so that the size of the layered part SL along the step direction becomes larger every time the layered part SL is removed in order to remove the unit processing target part W_unit that is removed last, and (iii) control the processing light EL so that the size of the layered part SL along the step direction is kept to be constant and the area in which the layered part SL is removed moves along the step direction every time the layered part SL is removed in order to remove the other unit processing target part W_unit.

In the above described description, the processing apparatus 1 performs the removal processing for removing a part of the workpiece W by irradiating the workpiece W with the processing light EL. However, the processing apparatus 1 may perform a processing that is different from the removal processing by irradiating the workpiece W with the processing light EL. For example, the processing apparatus 1 may perform the additive processing on the workpiece W by irradiating the workpiece W with the processing light EL. For example, the processing apparatus 1 may perform the marking processing for forming a desired pattern on the surface of the workpiece W by changing a characteristic of at least a part of the surface of the workpiece W by the irradiation of the processing light EL.

In the above described description, the stage apparatus 3 includes the stage driving system 33. However, the stage apparatus 3 may not include the stage driving system 33. Namely, the stage 32 may not move. When the stage 32 does not move, the stage apparatus 3 may not include the position measurement device 34. In the above described description, the processing system SYS includes the driving systems 5 and 6. However, the processing system SYS may not include at least one of the driving systems 5 and 6. Namely, at least one of the processing apparatus 1 and the measurement apparatus 2 may not move. In this case, the processing system SYS may not include at least one of the position measurement devices 51 and 61.

In the above described description, the processing system SYS includes the measurement apparatus 2. However, the processing system SYS may not include the measurement apparatus 2. In this case, the processing system SYS may not include the driving system 6 and the position measurement device 61 that are components related to the measurement apparatus 2.

In the above described description, the processing apparatus 1 processes the workpiece W by irradiating the workpiece W with the processing light EL. However, the processing apparatus 1 may process the workpiece W by irradiating the workpiece W with any energy beam (this energy beam may be referred to as a "processing beam") that is different from the light. In this case, the processing apparatus 1 may include a beam irradiation apparatus that is configured to emit any energy beam in addition to or instead of the light source 11. A charged particle beam such as an electron beam and an ion beam is one example of the energy beam. An electromagnetic wave is another example of the energy beam.

At least a part of the features of each embodiment described above may be appropriately combined with at least another part of the features of each embodiment described above. A part of the features of each embodiment described above may not be used. Moreover, the disclosures of all publications and United States patents that are cited in each embodiment described above are incorporated in the disclosures of the present application by reference if it is legally permitted.

The present invention is not limited to the above described examples and is allowed to be changed, if desired, without departing from the essence or spirit of the invention which can be read from the claims and the entire specification, and a beam processing apparatus, which involve such changes, are also intended to be within the technical scope of the present invention.

DESCRIPTION OF REFERENCE CODES

SYS processing system
1 processing apparatus
122 Galvano mirror
123 fθ lens
7 control apparatus
W workpiece
EL processing light

The invention claimed is:

1. A beam processing apparatus that irradiates a workpiece with a processing beam,
the beam processing apparatus comprising:
a beam irradiation apparatus that includes: an irradiation optical system that emits the processing beam; and a beam irradiation position change member that is disposed on an optical path of the processing beam and that changes an irradiation position of the processing beam on the workpiece;
a position change apparatus that changes a positional relationship between the irradiation optical system and the workpiece; and
a control apparatus that controls the beam irradiation apparatus, wherein
the control apparatus is configured to:
(i) control the beam irradiation apparatus to perform a removal processing of a first part of the workpiece by irradiating a first surface of the workpiece with the processing beam while moving the irradiation position of the processing beam along a first direction, and to perform a removal processing of a second part of the workpiece by irradiating a second surface of the workpiece, which is formed at the workpiece by the removal processing of the first part, with the processing beam while moving the irradiation position of the processing beam along the first direction within a moving range smaller than a moving range for performing the removal processing of the first part,
(ii) control the position change apparatus to change the positional relationship between the irradiation optical system and the workpiece after the removal processing of the first and second parts are performed, and
(iii) after the positional relationship between the irradiation optical system and the workpiece is changed, control the beam irradiation apparatus to perform a removal processing of a third part of the workpiece, which is adjacent to a position where the first part has been removed along the first direction, by irradiating the first surface of the workpiece with the processing beam while moving the irradiation position of the processing beam along the first direction, and to perform a removal processing of a fourth part of the workpiece, which is adjacent to a position where the second part has been removed along the first direction, by irradiating a third surface of the workpiece, which is formed at the workpiece by the removal processing of the third part, with the processing beam while moving the irradiation position of the processing beam along the first direction.

2. The beam processing apparatus according to claim 1, wherein the beam irradiation position change member changes the irradiation position along the first direction, and a size of the first part along the first direction is larger than a size of the second part along the first direction.

3. The beam processing apparatus according to claim 1, wherein the control apparatus controls the beam irradiation apparatus so that a moving range of the processing beam for the removal processing of the fourth part is equal to or larger than a moving range of the processing beam for the removal processing of the third part.

4. The beam processing apparatus according to claim 1, wherein the beam irradiation position change member changes the irradiation position along the first direction, and a size of the third part along the first direction is equal to or smaller than a size of the fourth part along the first direction.

5. The beam processing apparatus according to claim 1, wherein the beam irradiation position change member changes the irradiation position along the first direction, and a position of an end part of the fourth part at the second part side is located at a position that is away toward the second part side from a position of an end part of the third part at the first part side along the first direction.

6. The beam processing apparatus according to claim 1, wherein a position of an end part of the fourth part at an opposite side of the second part is located at a position that is same as or away toward the second part side from a position of an end part of the third part at an opposite side of the first part along the first direction.

7. The beam processing apparatus according to claim 1, wherein a position of an end part of the first part at an opposite side of the third part is same as a position of an end part of the second part at an opposite side of the fourth part along the first direction.

8. The beam processing apparatus according to claim 1, wherein a concave part is formed at the workpiece by a processing including the removal processing of the first part, the second part, the third part and the fourth part.

9. The beam processing apparatus according to claim 1, wherein after the first part is removed, the beam irradiation position change member moves the irradiation position of the processing beam along a second direction that intersects with the first direction and then performs a removal processing of a fifth part, which is adjacent to the first part, by irradiating the first surface of the workpiece with the processing beam while moving the irradiation position of the processing beam along the first direction.

10. The beam processing apparatus according to claim 9, wherein the removal processing of the second part is performed after the removal processing of the fifth part is performed.

11. The beam processing apparatus according to claim 1, wherein the control apparatus makes a condensed position of the processing beam for performing the removal processing of the fourth part be away more along a propagating direction of the processing beam from the first surface than a condensed position of the processing beam for performing the removal processing of the third part is.

12. The beam processing apparatus according to claim 1, wherein the control apparatus makes a condensed position of the processing beam for performing the removal processing of the second part be away more along a propagating direction of the processing beam from the first surface than a condensed position of the processing beam for performing the removal processing of the first part is.

13. A beam processing method that processes a workpiece by irradiating the workpiece with a processing beam through an irradiation optical system, the beam processing method comprising:

removing a first part of the workpiece by irradiating a first surface of the workpiece with the processing beam while moving an irradiation position of the processing beam along a first direction;

removing second part of the workpiece by irradiating a second surface of the workpiece, which is formed at the workpiece by the removing of the first part, with the processing beam while moving the irradiation position of the processing beam along the first direction within a moving range smaller than a moving range for removing the first part, after changing a positional relationship between the irradiation optical system and the workpiece, removing a third part of the workpiece, which is adjacent to a position where the first part has been removed along the first direction, by irradiating the first surface of the workpiece with the processing beam while moving the irradiation position of the processing beam along the first direction, and removing a fourth part of the workpiece, which is adjacent to a position where the second part has been removed along the first direction, by irradiating a third surface of the workpiece, which is formed at the workpiece by the removing of the third part, with the processing beam while moving the irradiation position of the processing beam along the first direction.

* * * * *